US012634516B2

(12) United States Patent
Byeon et al.

(10) Patent No.: US 12,634,516 B2
(45) Date of Patent: May 19, 2026

(54) METHOD AND APPARATUS FOR VIDEO CODING USING INTRA PREDICTION BASED ON SUBBLOCK PARTITIONING

(71) Applicants: HYUNDAI MOTOR COMPANY, Seoul (KR); KIA CORPORATION, Seoul (KR); KWANGWOON UNIVERSITY INDUSTRY-ACADEMIC COLLABORATION FOUNDATION, Seoul (KR)

(72) Inventors: Joo Hyung Byeon, Seoul (KR); Min Hun Lee, Uijeongbu-si (KR); Dong Gyu Sim, Seoul (KR); Seung Wook Park, Yongin-si (KR)

(73) Assignees: HYUNDAI MOTOR COMPANY, Seoul (KR); KIA CORPORATION, Seoul (KR); KWANGWOON UNIVERSITY INDUSTRY-ACADEMIC COLLABORATION FOUNDATION, Seoul (KR)

( * ) Notice: Subject to any disclaimer, the term of this patent is extended or adjusted under 35 U.S.C. 154(b) by 122 days.

(21) Appl. No.: 18/234,209

(22) Filed: Aug. 15, 2023

(65) Prior Publication Data

US 2023/0388541 A1 Nov. 30, 2023

Related U.S. Application Data

(63) Continuation of application No. PCT/KR2022/002343, filed on Feb. 17, 2022.

(30) Foreign Application Priority Data

Feb. 18, 2021 (KR) ........................ 10-2021-0021931
Feb. 16, 2022 (KR) ........................ 10-2022-0020034

(51) Int. Cl.
*H04N 19/593* (2014.01)
*H04N 19/11* (2014.01)
(Continued)

(52) U.S. Cl.
CPC ........... *H04N 19/593* (2014.11); *H04N 19/11* (2014.11); *H04N 19/119* (2014.11);
(Continued)

(58) Field of Classification Search
CPC .... H04N 19/11; H04N 19/119; H04N 19/136; H04N 19/176; H04N 19/184; H04N 19/593; H04N 19/70
See application file for complete search history.

(56) References Cited

U.S. PATENT DOCUMENTS 10,567,752 B2    2/2020   Zhao et al.
10,798,375 B2   10/2020   Piao et al.
(Continued)

FOREIGN PATENT DOCUMENTS

KR    20190068517 A    6/2019
KR    20190115426 A   10/2019
(Continued)

OTHER PUBLICATIONS

International Search Report and Written Opinion cited in corresponding international app No. PCT/KR2022/002343 ; May 31, 2022; 8 pp.

*Primary Examiner* — Peter D Le
(74) *Attorney, Agent, or Firm* — Lempia Summerfield Katz LLC

(57) ABSTRACT

A video coding method and a device using subblock partition-based intra prediction are disclosed. The video coding method and device perform intra prediction of the subblocks by eliminating unnecessary parsing of the intra-prediction mode or revising the prediction mode or reconstruction (Continued)

order when intra-predicting subblocks divided from the current block.

13 Claims, 18 Drawing Sheets

(51) Int. Cl.
| | |
|---|---|
| *H04N 19/119* | (2014.01) |
| *H04N 19/136* | (2014.01) |
| *H04N 19/176* | (2014.01) |
| *H04N 19/184* | (2014.01) |

(52) U.S. Cl.
CPC ......... *H04N 19/136* (2014.11); *H04N 19/176* (2014.11); *H04N 19/184* (2014.11)

(56) References Cited

U.S. PATENT DOCUMENTS

| | | | | |
|---|---|---|---|---|
| 10,798,382 | B2 | 10/2020 | Zhao et al. | |
| 11,240,490 | B2 | 2/2022 | Zhao et al. | |
| 11,297,309 | B2 | 4/2022 | Kim | |
| 11,405,605 | B2 | 8/2022 | Piao et al. | |
| 11,558,603 | B2 | 1/2023 | Zhao et al. | |
| 11,695,918 | B2 | 7/2023 | Piao et al. | |
| 2013/0034157 | A1* | 2/2013 | Helle | H04N 19/30 |
| | | | | 375/E7.243 |
| 2013/0051475 | A1* | 2/2013 | Joshi | H04N 19/159 |
| | | | | 375/240.18 |
| 2013/0064292 | A1* | 3/2013 | Song | H04N 19/109 |
| | | | | 375/240.03 |
| 2014/0205014 | A1* | 7/2014 | Nakamura | H04N 19/521 |
| | | | | 375/240.16 |
| 2019/0089961 | A1* | 3/2019 | Ahn | H04N 19/159 |
| 2019/0281285 | A1 | 9/2019 | Piao et al. | |
| 2019/0335172 | A1 | 10/2019 | Zhao et al. | |
| 2020/0007860 | A1* | 1/2020 | Zhao | H04N 19/119 |
| 2020/0029071 | A1* | 1/2020 | Kang | H04N 19/176 |
| 2020/0162726 | A1 | 5/2020 | Zhao et al. | |
| 2020/0162736 | A1* | 5/2020 | Seok | H04N 19/124 |
| 2020/0359014 | A1 | 11/2020 | Piao et al. | |
| 2020/0359015 | A1 | 11/2020 | Piao et al. | |
| 2021/0006778 | A1 | 1/2021 | Kim | |
| 2021/0136373 | A1* | 5/2021 | De Luxán Hernández | |
| | | | | H04N 19/91 |
| 2021/0385469 | A1* | 12/2021 | Deng | H04N 19/176 |
| 2022/0046230 | A1 | 2/2022 | Zhao et al. | |
| 2022/0086426 | A1* | 3/2022 | Lee | H04N 19/132 |
| 2022/0182602 | A1 | 6/2022 | Kim | |
| 2022/0182603 | A1* | 6/2022 | Lee | H04N 19/174 |
| 2022/0182624 | A1* | 6/2022 | Cao | H04N 19/119 |
| 2022/0191530 | A1* | 6/2022 | Sim | H04N 19/159 |
| 2023/0188704 | A1 | 6/2023 | Zhao et al. | |
| 2023/0319271 | A1* | 10/2023 | Lim | H04N 19/96 |
| | | | | 375/240.02 |
| 2024/0073428 | A1* | 2/2024 | Rath | H04N 19/593 |

FOREIGN PATENT DOCUMENTS

| | | |
|---|---|---|
| KR | 20200013766 A | 2/2020 |
| KR | 20200128156 A | 11/2020 |
| KR | 20200128160 A | 11/2020 |

* cited by examiner

0 : Planar
1 : DC

Reference Samples For Intra Prediction

Current Block          Horizontal Subblock Partitioning

At Horizontal Partitioning, Intra Prediction Performed In Revised Reconstruction Order At Vertical Partitioning, Intra Prediction Performed In Revised Reconstruction Order At Horizontal Partitioning, Revise Intra-prediction Mode In Opposite Direction At Vertical Partitioning, Revise Intra-prediction Mode In Opposite Direction Case for w/h <1          Case for w/h >1

At Horizontal Partitioning, Signaling-restricted Intra-prediction Mode

Case for w/h <1            Case for w/h >1

At Vertical Partitioning, Signaling-restricted Intra-prediction Mode

METHOD AND APPARATUS FOR VIDEO CODING USING INTRA PREDICTION BASED ON SUBBLOCK PARTITIONING

CROSS-REFERENCE TO RELATED APPLICATIONS

This application is a continuation of International Application No. PCT/KR2022/002343, filed on Feb. 17, 2022, which claims priority to Korean Patent Application No. 10-2021-0021931 filed on Feb. 18, 2021, and Korean Patent Application No. 10-2022-0020034 filed on Feb. 16, 2022, the entire disclosures each of which are incorporated herein by reference.

TECHNICAL FIELD

The present disclosure relates to a video coding method and a device using subblock division-based or partition-based intra prediction.

BACKGROUND

The statements in this section merely provide background information related to the present disclosure and do not necessarily constitute prior art.

Since video data has a large amount of data compared to audio or still image data, the video data requires a lot of hardware resources, including memory, to store or transmit the video data without processing for compression.

Accordingly, an encoder is generally used to compress and store or transmit video data. A decoder receives the compressed video data, decompresses the received compressed video data, and plays the decompressed video data. Video compression techniques include H.264/AVC, High Efficiency Video Coding (HEVC), and Versatile Video Coding (VVC), which has improved coding efficiency by about 30% or more compared to HEVC.

However, since the image size, resolution, and frame rate gradually increase, the amount of data to be encoded also increases. Accordingly, a new compression technique providing higher coding efficiency and an improved image enhancement effect than existing compression techniques is required.

In image (video) encoding, the image is divided into coding units (CUs), and when the CUs are encoded, all pixels within a block to be encoded are intra-predicted by using one prediction mode. Therefore, some pixels may be distanced far from the reference pixels, resulting in a lot of energy maintained in the residual signals to be encoded. The energy overstay in the residual signals can be more severe where the pixels to be predicted are further distanced from the reference pixels as with rectangular blocks, or with large blocks. To address these issues, the block could be subpartitioned into smaller blocks, which undesirably increases the overhead for transmitting the intra-prediction mode for each partitioned block.

On the other hand, techniques exist to address the increasing overhead issue. To increase intra prediction efficiency while reducing overhead, the block to be encoded may be subpartitioned into equally small blocks to perform prediction, wherein only a single prediction mode is transmitted for original block before the subdivision, and the single prediction mode is commonly used for the subpartitioned small blocks. This prior art technique is referred to as Intra Sub-Partitions (ISP) technique or ISP mode.

When ISP is applied for intra prediction of the current block, a video encoding device and a video decoding device may predict the subpartitioned blocks by signaling a single intra-prediction mode, while utilizing reference pixel values close respectively to the subpartitioned blocks. However, when applying the intra-prediction mode of the current block to the subblocks to employ this ISP technology, there are cases where the reference samples of the subblocks are useless. Therefore, in terms of coding efficiency, there is a need to provide efficient parsing of the intra-prediction mode of the current block and efficient reconstruction of subblocks.

SUMMARY

The present disclosure in some embodiments seeks to provide a video coding method and a device to perform intra prediction of the subblocks by eliminating unnecessary parsing of the intra-prediction mode or revising the prediction mode or reconstruction order when intra-predicting subblocks divided from the current block.

At least one aspect of the present disclosure provides a method performed by a video decoding device for intra predicting a current block. The method comprises decoding, from a bitstream, a subblock partition application flag that indicates whether to apply subpartitioning to the current block. The method also comprises performing an intra prediction of the current block in accordance with the subblock partition application flag. Here, when the subblock partition application flag is true, performing the intra prediction comprises decoding subpartition information from the bitstream; generating subblocks by partitioning the current block by using the subpartition information; decoding an intra-prediction mode of the current block from the bitstream; determining a reconstruction order of the subblocks based on the intra-prediction mode and aspect ratios of the subblocks; and generating predicted signals of the subblocks by performing an intra prediction on a current subblock according to the reconstruction order by using the intra-prediction mode.

Another aspect of the present disclosure provides a video decoding device. The device comprises an entropy decoder configured to decode, from a bitstream, a subblock partition application flag that indicates whether to apply subpartitioning to the current block. The device also comprises an intra predictor configured to perform an intra prediction of the current block in accordance with the subblock partition application flag. Here, the entropy decoder is responsive to the subblock partition application flag being true for decoding subpartition information from the bitstream and decoding an intra-prediction mode of the current block from the bitstream. The intra predictor is responsive to the subblock partition application flag being true for generating subblocks by partitioning the current block by using the subpartition information, determining a reconstruction order of the subblocks based on the intra-prediction mode and aspect ratios of the subblocks, and generating predicted signals of the subblocks by performing an intra prediction on a current subblock according to the reconstruction order by using the intra-prediction mode.

Yet another aspect of the present disclosure provides a method performed by a video encoding device for intra predicting a current block. The method comprises obtaining, from a high level, a subblock partition application flag that indicates whether to apply subpartitioning to the current block. The method also comprises performing an intra prediction of the current block in accordance with the subblock partition application flag. Here, when the subblock partition application flag is true, performing the intra prediction comprises obtaining subpartition information from the high level; generating subblocks by partitioning the current block by using the subpartition information; obtaining an intra-prediction mode of the current block from the high level; determining a reconstruction order of the subblocks based on the intra-prediction mode and aspect ratios of the subblocks; and generating predicted signals of the subblocks by performing an intra prediction on a current subblock according to the reconstruction order by using the intra-prediction mode.

As described above, the present disclosure provides a video coding method and a device to eliminate unnecessary parsing of the intra-prediction mode or revise the prediction mode or reconstruction order when intra-predicting subblocks divided from the current block. The video coding method and device may perform intra prediction of the subblocks to improve the coding efficiency.

DETAILED DESCRIPTION

Figure 1:
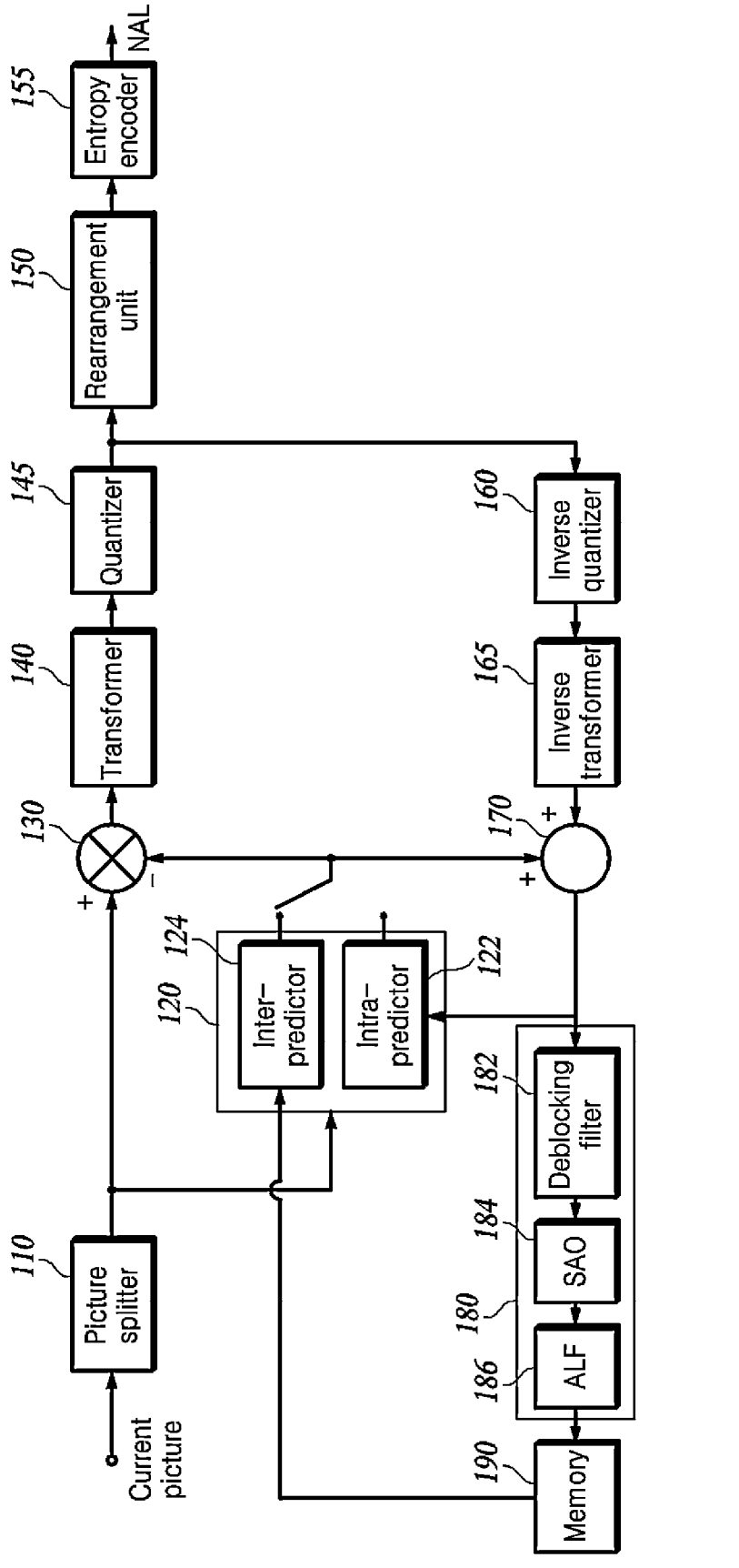
FIG. 1 is a block diagram of a video encoding apparatus that may implement the techniques of the present disclosure.

Hereinafter, some embodiments of the present disclosure are described in detail with reference to the accompanying illustrative drawings. In the following description, like reference numerals designate like elements, although the elements are shown in different drawings. Further, in the following description of some embodiments, detailed descriptions of related known components and functions when considered to obscure the subject of the present disclosure have been omitted for the purpose of clarity and for brevity.

FIG. 1 is a block diagram of a video encoding apparatus that may implement technologies of the present disclosure. Hereinafter, referring to illustration of FIG. 1, the video encoding apparatus and components of the apparatus are described.

The encoding apparatus may include a picture splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190.

Each component of the encoding apparatus may be implemented as hardware or software or implemented as a combination of hardware and software. Further, a function of each component may be implemented as software, and a microprocessor may also be implemented to execute the function of the software corresponding to each component.

One video is constituted by one or more sequences including a plurality of pictures. Each picture is split into a plurality of areas, and encoding is performed for each area. For example, one picture is split into one or more tiles or/and slices. Here, one or more tiles may be defined as a tile group. Each tile or/and slice is split into one or more coding tree units (CTUs). In addition, each CTU is split into one or more coding units (CUs) by a tree structure. Information applied to each CU is encoded as a syntax of the CU and information commonly applied to the CUs included in one CTU is encoded as the syntax of the CTU. Further, information commonly applied to all blocks in one slice is encoded as the syntax of a slice header, and information applied to all blocks constituting one or more pictures is encoded to a picture parameter set (PPS) or a picture header. Furthermore, information, which the plurality of pictures commonly refers to, is encoded to a sequence parameter set (SPS). In addition, information, which one or more SPS commonly refer to, is encoded to a video parameter set (VPS). Further, information commonly applied to one tile or tile group may also be encoded as the syntax of a tile or tile group header. The syntaxes included in the SPS, the PPS, the slice header, the tile, or the tile group header may be referred to as a high level syntax.

The picture splitter 110 determines a size of CTU. Information on the size of the CTU (CTU size) is encoded as the syntax of the SPS or the PPS and delivered to a video decoding apparatus.

The picture splitter 110 splits each picture constituting the video into a plurality of CTUs having a predetermined size and then recursively splits the CTU by using a tree structure. A leaf node in the tree structure becomes the CU, which is a basic unit of encoding.

The tree structure may be a quadtree (QT) in which a higher node (or a parent node) is split into four lower nodes (or child nodes) having the same size. The tree structure may also be a binarytree (BT) in which the higher node is split into two lower nodes. The tree structure may also be a ternarytree (TT) in which the higher node is split into three lower nodes at a ratio of 1:2:1. The tree structure may also be a structure in which two or more structures among the QT structure, the BT structure, and the TT structure are mixed. For example, a quadtree plus binarytree (QTBT) structure may be used or a quadtree plus binarytree ternarytree (QTBTTT) structure may be used. Here, a BTTT is added to the tree structures to be referred to as a multiple-type tree (MTT).

Figure 2:
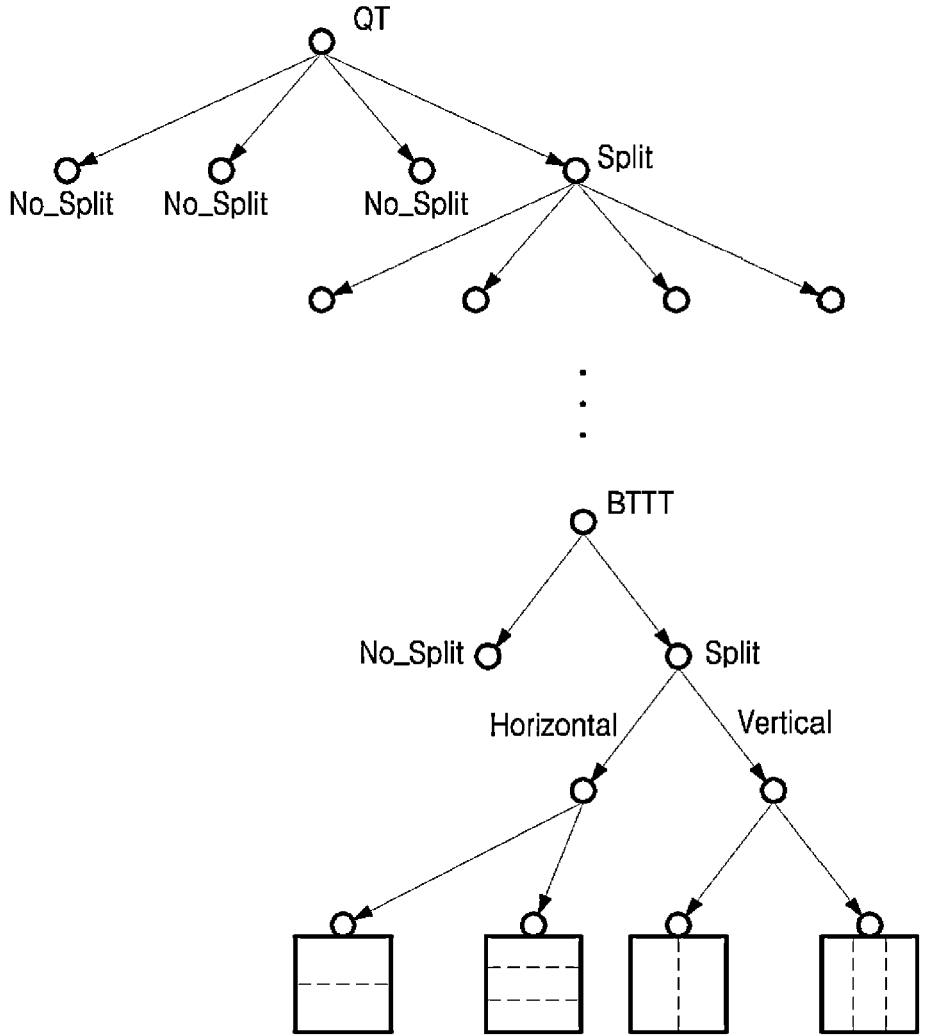
FIG. 2 illustrates a method for partitioning a block using a quadtree plus binarytree ternarytree (QTBTTT) structure.

FIG. 2 is a diagram for describing a method for splitting a block by using a QTBTTT structure.

As illustrated in FIG. 2, the CTU may first be split into the QT structure. Quadtree splitting may be recursive until the size of a splitting block reaches a minimum block size (MinQTSize) of the leaf node permitted in the QT. A first flag (QT_split_flag) indicating whether each node of the QT structure is split into four nodes of a lower layer is encoded by the entropy encoder 155 and signaled to the video decoding apparatus. When the leaf node of the QT is not larger than a maximum block size (MaxBTSize) of a root node permitted in the BT, the leaf node may be further split into at least one of the BT structure or the TT structure. A plurality of split directions may be present in the BT structure and/or the TT structure. For example, there may be two directions, i.e., a direction in which the block of the corresponding node is split horizontally and a direction in which the block of the corresponding node is split vertically. As illustrated in FIG. 2, when the MTT splitting starts, a second flag (mtt_split_flag) indicating whether the nodes are split, and a flag additionally indicating the split direction (vertical or horizontal), and/or a flag indicating a split type (binary or ternary) if the nodes are split are encoded by the entropy encoder 155 and signaled to the video decoding apparatus.

Alternatively, prior to encoding the first flag (QT_split_flag) indicating whether each node is split into four nodes of the lower layer, a CU split flag (split_cu_flag) indicating whether the node is split may also be encoded. When a value of the CU split flag (split_cu_flag) indicates that each node is not split, the block of the corresponding node becomes the leaf node in the split tree structure and becomes the CU, which is the basic unit of encoding. When the value of the CU split flag (split_cu_flag) indicates that each node is split, the video encoding apparatus starts encoding the first flag first by the above-described scheme.

When the QTBT is used as another example of the tree structure, there may be two types, i.e., a type (i.e., symmetric horizontal splitting) in which the block of the corresponding node is horizontally split into two blocks having the same size and a type (i.e., symmetric vertical splitting) in which the block of the corresponding node is vertically split into two blocks having the same size. A split flag (split_flag) indicating whether each node of the BT structure is split into the block of the lower layer and split type information indicating a splitting type are encoded by the entropy encoder 155 and delivered to the video decoding apparatus. Meanwhile, a type in which the block of the corresponding node is split into two blocks of a form of being asymmetrical to each other may be additionally present. The asymmetrical form may include a form in which the block of the corresponding node split into two rectangular blocks having a size ratio of 1:3 or may also include a form in which block of the corresponding node is split in a diagonal direction.

The CU may have various sizes according to QTBT or QTBTTT splitting from the CTU. Hereinafter, a block corresponding to a CU (i.e., the leaf node of the QTBTTT) to be encoded or decoded is referred to as a "current block". As the QTBTTT splitting is adopted, a shape of the current block may also be a rectangular shape in addition to a square shape.

The predictor 120 predicts the current block to generate a prediction block. The predictor 120 includes an intra predictor 122 and an inter predictor 124.

In general, each of the current blocks in the picture may be predictively coded. In general, the prediction of the current block may be performed by using an intra prediction technology (using data from the picture including the current block) or an inter prediction technology (using data from a picture coded before the picture including the current block). The inter prediction includes both unidirectional prediction and bidirectional prediction.

Figure 3A:
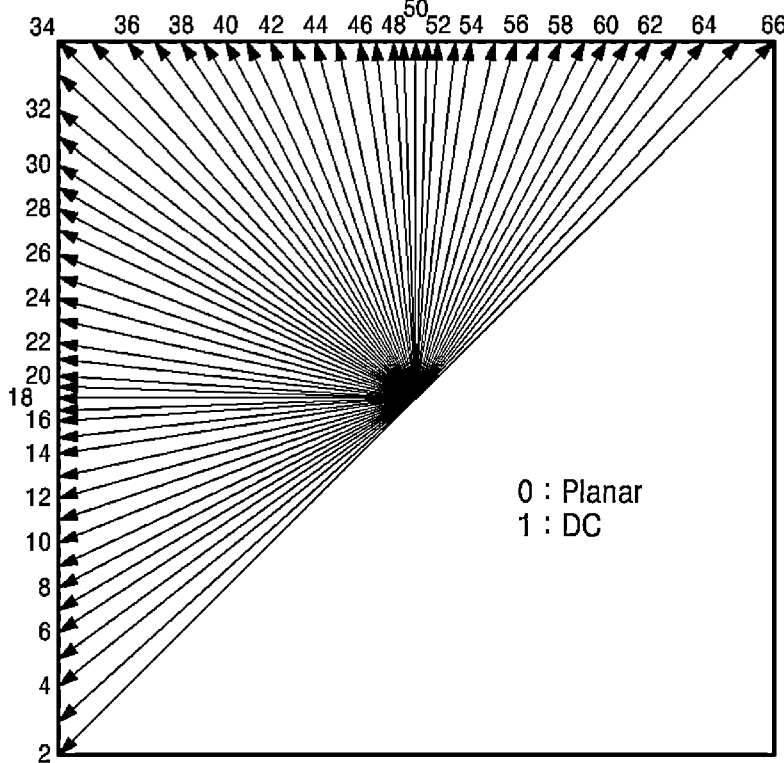
FIGS. 3A and 3B illustrate a plurality of intra prediction modes including wide-angle intra prediction modes.

The intra predictor 122 predicts pixels in the current block by using pixels (reference pixels) positioned on a neighbor of the current block in the current picture including the current block. There is a plurality of intra prediction modes according to the prediction direction. For example, as illustrated in FIG. 3A, the plurality of intra prediction modes may include 2 non-directional modes including a Planar mode and a DC mode and may include 65 directional modes. A neighboring pixel and an arithmetic equation to be used are defined differently according to each prediction mode.

Figure 3B:
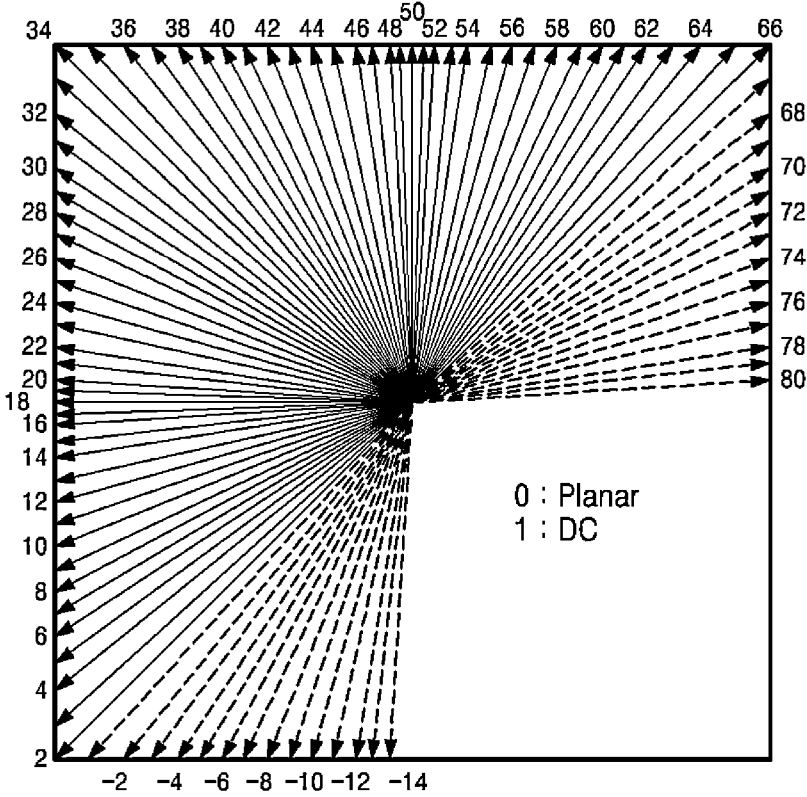

For efficient directional prediction for the current block having the rectangular shape, directional modes (#67 to #80, intra prediction modes #–1 to #–14) illustrated as dotted arrows in FIG. 3B may be additionally used. The directional modes may be referred to as "wide angle intra-prediction modes". In FIG. 3B, the arrows indicate corresponding reference samples used for the prediction and do not represent the prediction directions. The prediction direction is opposite to a direction indicated by the arrow. When the current block has the rectangular shape, the wide angle intra-prediction modes are modes in which the prediction is performed in an opposite direction to a specific directional mode without additional bit transmission. In this case, among the wide angle intra-prediction modes, some wide angle intra-prediction modes usable for the current block may be determined by a ratio of a width and a height of the current block having the rectangular shape. For example, when the current block has a rectangular shape in which the height is smaller than the width, wide angle intra-prediction modes (intra prediction modes #67 to #80) having an angle smaller than 45 degrees are usable. When the current block has a rectangular shape in which the width is larger than the height, the wide angle intra-prediction modes having an angle larger than –135 degrees are usable.

The intra predictor 122 may determine an intra prediction to be used for encoding the current block. In some examples, the intra predictor 122 may encode the current block by using multiple intra prediction modes and also select an appropriate intra prediction mode to be used from tested modes. For example, the intra predictor 122 may calculate rate-distortion values by using a rate-distortion analysis for multiple tested intra prediction modes and also select an intra prediction mode having best rate-distortion features among the tested modes.

The intra predictor 122 selects one intra prediction mode among a plurality of intra prediction modes and predicts the current block by using a neighboring pixel (reference pixel) and an arithmetic equation determined according to the selected intra prediction mode. Information on the selected intra prediction mode is encoded by the entropy encoder 155 and delivered to the video decoding apparatus.

The inter predictor 124 generates the prediction block for the current block by using a motion compensation process. The inter predictor 124 searches a block most similar to the current block in a reference picture encoded and decoded earlier than the current picture and generates the prediction block for the current block by using the searched block. In addition, a motion vector (MV) is generated, which corresponds to a displacement between the current bock in the current picture and the prediction block in the reference picture. In general, motion estimation is performed for a luma component, and a motion vector calculated based on the luma component is used for both the luma component and a chroma component. Motion information including information the reference picture and information on the motion vector used for predicting the current block is encoded by the entropy encoder 155 and delivered to the video decoding apparatus.

The inter predictor 124 may also perform interpolation for the reference picture or a reference block in order to increase accuracy of the prediction. In other words, sub-samples between two contiguous integer samples are interpolated by applying filter coefficients to a plurality of contiguous integer samples including two integer samples. When a process of searching a block most similar to the current block is performed for the interpolated reference picture, not integer sample unit precision but decimal unit precision may be expressed for the motion vector. Precision or resolution of the motion vector may be set differently for each target area to be encoded, e.g., a unit such as the slice, the tile, the CTU, the CU, etc. When such an adaptive motion vector resolution (AMVR) is applied, information on the motion vector resolution to be applied to each target area should be signaled for each target area. For example, when the target area is the CU, the information on the motion vector resolution applied for each CU is signaled. The information on the motion vector resolution may be information representing precision of a motion vector difference to be described below.

Meanwhile, the inter predictor 124 may perform inter prediction by using bi-prediction. In the case of the bi-prediction, two reference pictures and two motion vectors representing a block position most similar to the current block in each reference picture are used. The inter predictor 124 selects a first reference picture and a second reference picture from reference picture list 0 (RefPicList0) and reference picture list 1 (RefPicList1), respectively. The inter predictor 124 also searches blocks most similar to the current blocks in the respective reference pictures to generate a first reference block and a second reference block. In addition, the prediction block for the current block is generated by averaging or weighted-averaging the first reference block and the second reference block. In addition, motion information including information on two reference pictures used for predicting the current block and information on two motion vectors is delivered to the entropy encoder 155. Here, reference picture list 0 may be constituted by pictures before the current picture in a display order among pre-restored pictures, and reference picture list 1 may be constituted by pictures after the current picture in the display order among the pre-restored pictures. However, although not particularly limited thereto, the pre-restored pictures after the current picture in the display order may be additionally included in reference picture list 0. Inversely, the pre-restored pictures before the current picture may also be additionally included in reference picture list 1.

In order to minimize a bit quantity consumed for encoding the motion information, various methods may be used.

For example, when the reference picture and the motion vector of the current block are the same as the reference picture and the motion vector of the neighboring block, information capable of identifying the neighboring block is encoded to deliver the motion information of the current block to the video decoding apparatus. Such a method is referred to as a merge mode.

In the merge mode, the inter predictor 124 selects a predetermined number of merge candidate blocks (hereinafter, referred to as a "merge candidate") from the neighboring blocks of the current block.

Figure 4:
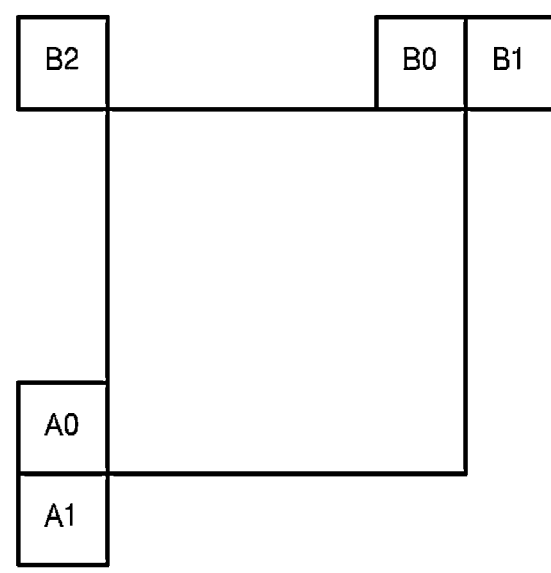
FIG. 4 illustrates neighboring blocks of a current block.

As a neighboring block for deriving the merge candidate, all or some of a left block A0, a bottom left block A1, a top block B0, a top right block B1, and a top left block B2 adjacent to the current block in the current picture may be used as illustrated in FIG. 4. Further, a block positioned within the reference picture (may be the same as or different from the reference picture used for predicting the current block) other than the current picture at which the current block is positioned may also be used as the merge candidate. For example, a co-located block with the current block within the reference picture or blocks adjacent to the co-located block may be additionally used as the merge candidate. If the number of merge candidates selected by the method described above is smaller than a preset number, a zero vector is added to the merge candidate.

The inter predictor 124 configures a merge list including a predetermined number of merge candidates by using the neighboring blocks. A merge candidate to be used as the motion information of the current block is selected from the merge candidates included in the merge list, and merge index information for identifying the selected candidate is generated. The generated merge index information is encoded by the entropy encoder 155 and delivered to the video decoding apparatus.

The merge skip mode is a special case of the merge mode. After quantization, when all transform coefficients for entropy encoding are close to zero, only the neighboring block selection information is transmitted without transmitting residual signals. By using the merge skip mode, it is possible to achieve a relatively high encoding efficiency for images with slight motion, still images, screen content images, and the like.

Hereafter, the merge mode and the merge skip mode are collectively referred to as the merge/skip mode.

Another method for encoding the motion information is an advanced motion vector prediction (AMVP) mode.

In the AMVP mode, the inter predictor 124 derives motion vector predictor candidates for the motion vector of the current block by using the neighboring blocks of the current block. As a neighboring block used for deriving the motion vector predictor candidates, all or some of a left block A0, a bottom left block A1, a top block B0, a top right block B1, and a top left block B2 adjacent to the current block in the current picture illustrated in FIG. 4 may be used. Further, a block positioned within the reference picture (may be the same as or different from the reference picture used for predicting the current block) other than the current picture at which the current block is positioned may also be used as the neighboring block used for deriving the motion vector predictor candidates. For example, a co-located block with the current block within the reference picture or blocks adjacent to the co-located block may be used. If the number of motion vector candidates selected by the method described above is smaller than a preset number, a zero vector is added to the motion vector candidate.

The inter predictor 124 derives the motion vector predictor candidates by using the motion vector of the neighboring blocks and determines motion vector predictor for the motion vector of the current block by using the motion vector predictor candidates. In addition, a motion vector difference is calculated by subtracting motion vector predictor from the motion vector of the current block.

The motion vector predictor may be acquired by applying a pre-defined function (e.g., center value and average value computation, etc.) to the motion vector predictor candidates. In this case, the video decoding apparatus also knows the pre-defined function. Further, since the neighboring block used for deriving the motion vector predictor candidate is a block in which encoding and decoding are already completed, the video decoding apparatus may also already know the motion vector of the neighboring block. Therefore, the video encoding apparatus does not need to encode information for identifying the motion vector predictor candidate. Accordingly, in this case, information on the motion vector difference and information on the reference picture used for predicting the current block are encoded.

Meanwhile, the motion vector predictor may also be determined by a scheme of selecting any one of the motion vector predictor candidates. In this case, information for identifying the selected motion vector predictor candidate is additional encoded jointly with the information on the motion vector difference and the information on the reference picture used for predicting the current block.

The subtractor 130 generates a residual block by subtracting the prediction block generated by the intra predictor 122 or the inter predictor 124 from the current block.

The transformer 140 transforms residual signals in a residual block having pixel values of a spatial domain into transform coefficients of a frequency domain. The transformer 140 may transform residual signals in the residual block by using a total size of the residual block as a transform unit or also split the residual block into a plurality of subblocks and perform the transform by using the subblock as the transform unit. Alternatively, the residual block is divided into two subblocks, which are a transform area and a non-transform area, to transform the residual signals by using only the transform area subblock as the transform unit. Here, the transform area subblock may be one of two rectangular blocks having a size ratio of 1:1 based on a horizontal axis (or vertical axis). In this case, a flag (cu_sbt_flag) indicates that only the subblock is transformed, and directional (vertical/horizontal) information (cu_sbt_horizontal_flag) and/or positional information (cu_sbt_pos_flag) are encoded by the entropy encoder 155 and signaled to the video decoding apparatus. Further, a size of the transform area subblock may have a size ratio of 1:3 based on the horizontal axis (or vertical axis). In this case, a flag (cu_sbt_quad_flag) dividing the corresponding splitting is additionally encoded by the entropy encoder 155 and signaled to the video decoding apparatus.

Meanwhile, the transformer 140 may perform the transform for the residual block individually in a horizontal direction and a vertical direction. For the transform, various types of transform functions or transform matrices may be used. For example, a pair of transform functions for horizontal transform and vertical transform may be defined as a multiple transform set (MTS). The transformer 140 may select one transform function pair having highest transform efficiency in the MTS and transform the residual block in each of the horizontal and vertical directions. Information (mts_idx) on the transform function pair in the MTS is encoded by the entropy encoder 155 and signaled to the video decoding apparatus.

The quantizer 145 quantizes the transform coefficients output from the transformer 140 using a quantization parameter and outputs the quantized transform coefficients to the entropy encoder 155. The quantizer 145 may also immediately quantize the related residual block without the transform for any block or frame. The quantizer 145 may also apply different quantization coefficients (scaling values) according to positions of the transform coefficients in the transform block. A quantization matrix applied to transform coefficients quantized arranged in 2 dimensional may be encoded and signaled to the video decoding apparatus.

The rearrangement unit 150 may perform realignment of coefficient values for quantized residual values.

The rearrangement unit 150 may change a 2D coefficient array to a 1D coefficient sequence by using coefficient scanning. For example, the rearrangement unit 150 may output the 1D coefficient sequence by scanning a DC coefficient to a high-frequency domain coefficient by using a zig-zag scan or a diagonal scan. According to the size of the transform unit and the intra prediction mode, vertical scan of scanning a 2D coefficient array in a column direction and horizontal scan of scanning a 2D block type coefficient in a row direction may also be used instead of the zig-zag scan. In other words, according to the size of the transform unit and the intra prediction mode, a scan method to be used may be determined among the zig-zag scan, the diagonal scan, the vertical scan, and the horizontal scan.

The entropy encoder 155 generates a bitstream by encoding a sequence of 1D quantized transform coefficients output from the rearrangement unit 150 by using various encoding schemes including a Context-based Adaptive Binary Arithmetic Code (CABAC), an Exponential Golomb, or the like.

Further, the entropy encoder 155 encodes information such as a CTU size, a CTU split flag, a QT split flag, an MTT split type, an MTT split direction, etc., related to the block splitting to allow the video decoding apparatus to split the block equally to the video encoding apparatus. Further, the entropy encoder 155 encodes information on a prediction type indicating whether the current block is encoded by intra prediction or inter prediction. The entropy encoder 155 encodes intra prediction information (i.e., information on an intra prediction mode) or inter prediction information (in the case of the merge mode, a merge index and in the case of the AMVP mode, information on the reference picture index and the motion vector difference) according to the prediction type. Further, the entropy encoder 155 encodes information related to quantization, i.e., information on the quantization parameter and information on the quantization matrix.

The inverse quantizer 160 dequantizes the quantized transform coefficients output from the quantizer 145 to generate the transform coefficients. The inverse transformer 165 transforms the transform coefficients output from the inverse quantizer 160 into a spatial domain from a frequency domain to restore the residual block.

The adder 170 adds the restored residual block and the prediction block generated by the predictor 120 to restore the current block. Pixels in the restored current block may be used as reference pixels when intra-predicting a next-order block.

The loop filter unit 180 performs filtering for the restored pixels in order to reduce blocking artifacts, ringing artifacts, blurring artifacts, etc., which occur due to block based prediction and transform/quantization. The loop filter unit 180 as an in-loop filter may include all or some of a deblocking filter 182, a sample adaptive offset (SAO) filter 184, and an adaptive loop filter (ALF) 186.

The deblocking filter 182 filters a boundary between the restored blocks in order to remove a blocking artifact, which occurs due to block unit encoding/decoding, and the SAO filter 184 and the ALF 186 perform additional filtering for a deblocked filtered video. The SAO filter 184 and the ALF

186 are filters used for compensating differences between the restored pixels and original pixels, which occur due to lossy coding. The SAO filter 184 applies an offset as a CTU unit to enhance a subjective image quality and encoding efficiency. On the other hand, the ALF 186 performs block unit filtering and compensates distortion by applying different filters by dividing a boundary of the corresponding block and a degree of a change amount. Information on filter coefficients to be used for the ALF may be encoded and signaled to the video decoding apparatus.

The restored block filtered through the deblocking filter 182, the SAO filter 184, and the ALF 186 is stored in the memory 190. When all blocks in one picture are restored, the restored picture may be used as a reference picture for inter predicting a block within a picture to be encoded afterwards.

Figure 5:
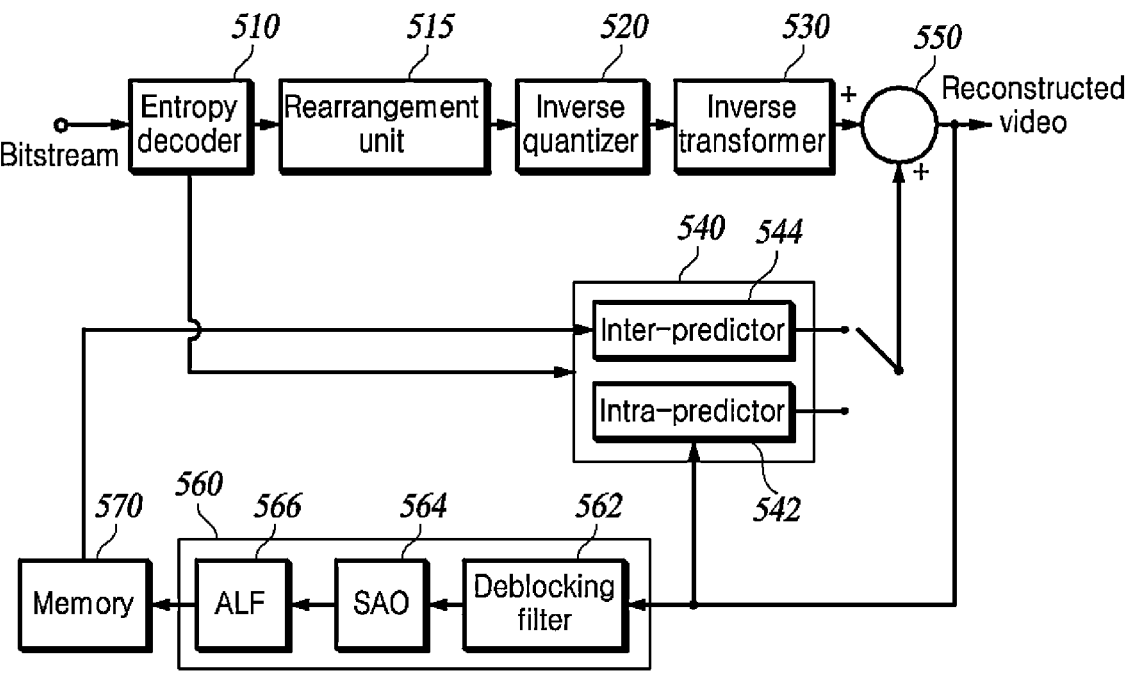
FIG. 5 is a block diagram of a video decoding apparatus that may implement the techniques of the present disclosure.

FIG. 5 is a functional block diagram of a video decoding apparatus that may implement the technologies of the present disclosure. Hereinafter, referring to FIG. 5, the video decoding apparatus and components of the apparatus are described.

The video decoding apparatus may include an entropy decoder 510, a rearrangement unit 515, an inverse quantizer 520, an inverse transformer 530, a predictor 540, an adder 550, a loop filter unit 560, and a memory 570.

Similar to the video encoding apparatus of FIG. 1, each component of the video decoding apparatus may be implemented as hardware or software or implemented as a combination of hardware and software. Further, a function of each component may be implemented as the software, and a microprocessor may also be implemented to execute the function of the software corresponding to each component.

The entropy decoder 510 extracts information related to block splitting by decoding the bitstream generated by the video encoding apparatus to determine a current block to be decoded and extracts prediction information required for restoring the current block and information on the residual signals.

The entropy decoder 510 determines the size of the CTU by extracting information on the CTU size from a sequence parameter set (SPS) or a picture parameter set (PPS) and splits the picture into CTUs having the determined size. In addition, the CTU is determined as a highest layer of the tree structure, i.e., a root node, and split information for the CTU may be extracted to split the CTU by using the tree structure.

For example, when the CTU is split by using the QTBTTT structure, a first flag (QT_split_flag) related to splitting of the QT is first extracted to split each node into four nodes of the lower layer. In addition, a second flag (mtt_split_flag), a split direction (vertical/horizontal), and/or a split type (binary/ternary) related to splitting of the MTT are extracted with respect to the node corresponding to the leaf node of the QT to split the corresponding leaf node into an MTT structure. As a result, each of the nodes below the leaf node of the QT is recursively split into the BT or TT structure.

As another example, when the CTU is split by using the QTBTTT structure, a CU split flag (split_cu_flag) indicating whether the CU is split is extracted. When the corresponding block is split, the first flag (QT_split_flag) may also be extracted. During a splitting process, with respect to each node, recursive MTT splitting of 0 times or more may occur after recursive QT splitting of 0 times or more. For example, with respect to the CTU, the MTT splitting may immediately occur or on the contrary, only QT splitting of multiple times may also occur.

As another example, when the CTU is split by using the QTBT structure, the first flag (QT_split_flag) related to the splitting of the QT is extracted to split each node into four nodes of the lower layer. In addition, a split flag (split_flag) indicating whether the node corresponding to the leaf node of the QT being further split into the BT, and split direction information are extracted.

Meanwhile, when the entropy decoder 510 determines a current block to be decoded by using the splitting of the tree structure, the entropy decoder 510 extracts information on a prediction type indicating whether the current block is intra predicted or inter predicted. When the prediction type information indicates the intra prediction, the entropy decoder 510 extracts a syntax element for intra prediction information (intra prediction mode) of the current block. When the prediction type information indicates the inter prediction, the entropy decoder 510 extracts information representing a syntax element for inter prediction information, i.e., a motion vector and a reference picture to which the motion vector refers.

Further, the entropy decoder 510 extracts quantization related information, and extracts information on the quantized transform coefficients of the current block as the information on the residual signals.

The rearrangement unit 515 may change a sequence of 1D quantized transform coefficients entropy-decoded by the entropy decoder 510 to a 2D coefficient array (i.e., block) again in a reverse order to the coefficient scanning order performed by the video encoding apparatus.

The inverse quantizer 520 dequantizes the quantized transform coefficients and dequantizes the quantized transform coefficients by using the quantization parameter. The inverse quantizer 520 may also apply different quantization coefficients (scaling values) to the quantized transform coefficients arranged in 2D. The inverse quantizer 520 may perform dequantization by applying a matrix of the quantization coefficients (scaling values) from the video encoding apparatus to a 2D array of the quantized transform coefficients.

The inverse transformer 530 generates the residual block for the current block by restoring the residual signals by inversely transforming the dequantized transform coefficients into the spatial domain from the frequency domain.

Further, when the inverse transformer 530 inversely transforms a partial area (subblock) of the transform block, the inverse transformer 530 extracts a flag (cu_sbt_flag) that only the subblock of the transform block is transformed, directional (vertical/horizontal) information (cu_sbt_horizontal_flag) of the subblock, and/or positional information (cu_sbt_pos_flag) of the subblock. The inverse transformer 530 also inversely transforms the transform coefficients of the corresponding subblock into the spatial domain from the frequency domain to restore the residual signals and fills an area, which is not inversely transformed, with a value of "0" as the residual signals to generate a final residual block for the current block.

Further, when the MTS is applied, the inverse transformer 530 determines the transform index or the transform matrix to be applied in each of the horizontal and vertical directions by using the MTS information (mts_idx) signaled from the video encoding apparatus. The inverse transformer 530 also performs inverse transform for the transform coefficients in the transform block in the horizontal and vertical directions by using the determined transform function.

The predictor 540 may include the intra predictor 542 and the inter predictor 544. The intra predictor 542 is activated when the prediction type of the current block is the intra prediction, and the inter predictor 544 is activated when the prediction type of the current block is the inter prediction.

The intra predictor 542 determines the intra prediction mode of the current block among the plurality of intra prediction modes from the syntax element for the intra prediction mode extracted from the entropy decoder 510. The intra predictor 542 also predicts the current block by using neighboring reference pixels of the current block according to the intra prediction mode.

The inter predictor 544 determines the motion vector of the current block and the reference picture to which the motion vector refers by using the syntax element for the inter prediction mode extracted from the entropy decoder 510.

The adder 550 restores the current block by adding the residual block output from the inverse transformer 530 and the prediction block output from the inter predictor 544 or the intra predictor 542. Pixels within the restored current block are used as a reference pixel upon intra predicting a block to be decoded afterwards.

The loop filter unit 560 as an in-loop filter may include a deblocking filter 562, an SAO filter 564, and an ALF 566. The deblocking filter 562 performs deblocking filtering a boundary between the restored blocks in order to remove the blocking artifact, which occurs due to block unit decoding. The SAO filter 564 and the ALF 566 perform additional filtering for the restored block after the deblocking filtering in order to compensate differences between the restored pixels and original pixels, which occur due to lossy coding. The filter coefficients of the ALF are determined by using information on filter coefficients decoded from the bit-stream.

The restored block filtered through the deblocking filter 562, the SAO filter 564, and the ALF 566 is stored in the memory 570. When all blocks in one picture are restored, the restored picture may be used as a reference picture for inter predicting a block within a picture to be encoded afterwards.

The present disclosure in some embodiments relates to encoding and decoding video images as described above. More specifically, the present disclosure provides a video coding method and a device for performing intra prediction of subblocks by eliminating unnecessary parsing of the intra-prediction mode or by revising the prediction mode or reconstruction order when intra-predicting the subblocks divided from the current block.

The following embodiments may be applied to the entropy decoder 510 and the intra predictor 542 in the video decoding device. They may also be applied to the intra predictor 122 in the video encoding device.

In the following description, a block has an aspect ratio that is defined as the horizontal length (W: Width) of the block divided by the vertical length (H: Height), i.e., the ratio between the horizontal length and the vertical length.

Hereinafter, a particular flag being true indicates that the value of that flag is 1, and a particular flag being false indicates that the value of the flag is 0.

Hereinafter, the phrase that the video decoding device or its internal entropy decoder 510 decodes data from the bitstream is used interchangeably with the phrase that the same device or unit parses data.

I. Intra Prediction and Intra Sub-Partitions (ISP)

In the Versatile Video Coding (VVC) technique, the luma block has the intra-prediction modes of non-directional modes (i.e., planar and DC) and the remaining subdivided directional modes (i.e., modes 2 to 66), as exemplified in FIG. 3A. As added for example in FIG. 3B, the luma block further has the intra-prediction modes of directional modes (modes −14 to −1 and modes 67 to 80) based on the wide-angle intra-prediction.

When the wide-angle intra-prediction is applied, the video encoding device transmits the intra-prediction mode value as shown in FIG. 3A to maintain the existing encoding scheme. The video decoding device parses the current blocks intra-prediction mode from the bitstream and then implicitly revises the parsed values to intra-prediction mode values in the opposite direction, i.e., rotated 180 degrees, based on the current blocks aspect ratio. For example, if the current block has an aspect ratio of 2 and the decoded prediction mode is 2, the video decoding device revises the prediction mode of the current block to the opposite prediction mode of 66.

Based on the prediction mode of the luma block, several techniques exist to improve the encoding efficiency of intra predictions. ISP techniques subpartition the current block into smaller blocks of equal size and then cause the intra-prediction mode to be shared across the subblocks, but apply a transform to each subblock. The subpartitioning of the block may be in a horizontal or vertical direction.

In the following description, the large block before being subpartitioned is referred to as the current block, and each of the subpartitioned smaller blocks is referred to as a sub-block.

The operation of the ISP technique is as follows.

The video encoding device is responsive to the trueness of the ISP-enabled flag of sps_isp_enabled_flag in the high level SPS for transmitting intra_subpartitions_mode_flag and intra_subpartitions_split_flag. The video decoding device first parses the ISP-enabled flag of sps_isp_enabled_flag from the bitstream. If the ISP-enabled flag is true, the video decoding device may decode the intra_subpartitions_mode_flag and intra_subpartitions_split_flag from the bitstream.

The video encoding device signals to the video decoding device the intra_subpartitions_mode_flag, which indicates whether to apply ISP, and the intra_subpartitions_split_flag, which indicates the subpartitioning method. The subpartition type of IntraSubPartitionsSplitType according to intra_subpartitions_mode_flag and intra_subpartitions_split_flag is shown in Table 1.

TABLE 1

| IntraSubPartitionsSplitType | Name of IntraSubPartitionsSplitType |
|---|---|
| 0 | ISP_NO_SPLIT |
| 1 | ISP_HOR_SPLIT |
| 2 | ISP_VER_SPLIT |

The ISP technology sets the partition type of IntraSubPartitionsSplitType as follows.

If intra_subpartitions_mode_flag is 0, IntraSubPartitionsSplitType is set to 0 and no subblock partitioning is performed (ISP_NO_SPLIT), i.e., ISP is not applied.

If intra_subpartitions_mode_flag is non-zero, ISP is applied. At this time, IntraSubPartitionsSplitType is set to the value of 1+intra_subpartitions_split_flag, and subblock partitioning is performed according to the partition type. If IntraSubPartitionsSplitType=1, horizontal subblock partitioning (ISP_HOR_SPLIT) is performed, and if IntraSubPartitionsSplitType=2, vertical subblock partitioning (ISP_VER_SPLIT) is performed. In short, intra_subpartitions_split_flag may indicate the direction of subblock partitioning.

For example, if the ISP mode involving horizontal sub-partitioning is applied to the current block, IntraSubPartitionsSplitType is 1, intra_subpartitions_mode_flag is 1, and intra_subpartitions_split_flag is 0.

Here, intra_subpartitions_mode_flag is expressed as a subblock partition application flag, intra_subpartitions_split_flag is expressed as a subblock partition direction flag, and IntraSubPartitionsSplitType is expressed as a subblock partition type.

Figure 6A:
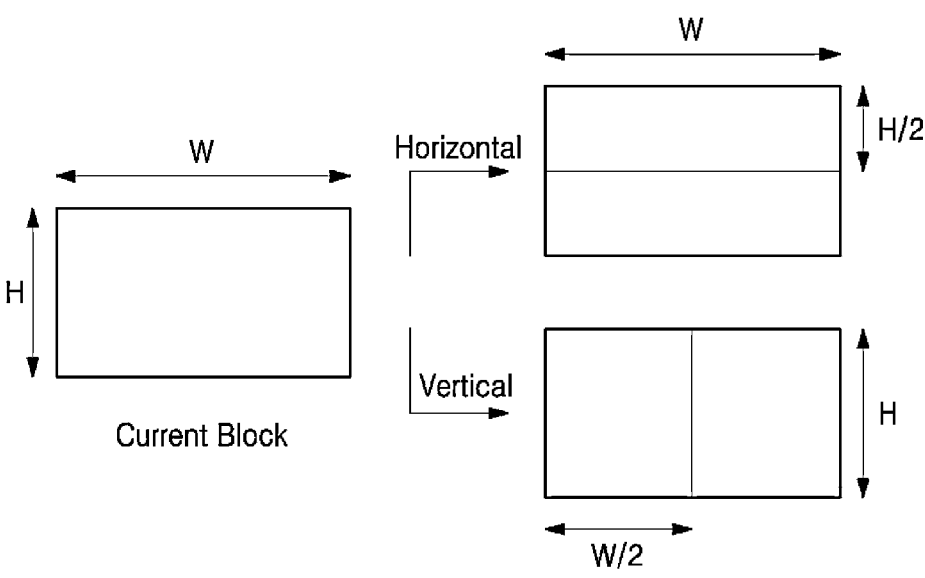
FIGS. 6A and 6B are diagrams illustrating a current block and subpartitioned subblocks.
Figure 6B:
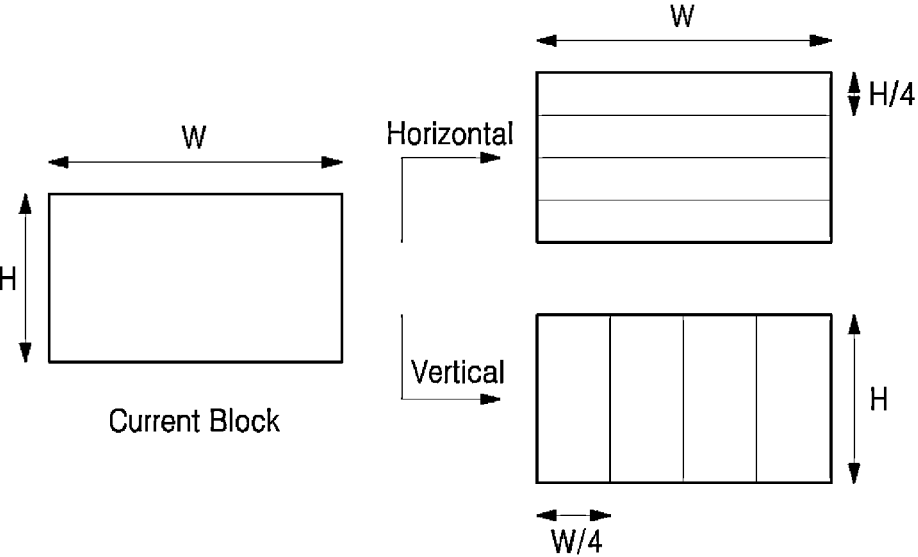

When partitioning the current block in the horizontal or vertical direction, the application of ISP may be restricted by the size of the current block at the time of subpartitioning to prevent too small blocks from being subpartitioned. If the current block is sized 4×4, ISP is not applied. A block of size 4×8 or 8×4 may be split into two subblocks with the same shape and size, as shown in FIG. 6A, which is called a Half_Split. A block of any other size may be split into four subblocks of the same shape and size, as shown in FIG. 6B, which is called a Quarter_Split. Note that ISP is not applied for blocks of size 4×4, and only bisection is applied for blocks of size 4×8 or 8×4, to reduce the dependence of intra-prediction between blocks with widths/heights of 1 or 2 pixels.

The video encoding device encodes the subblocks sequentially. At this time, each subblock shares the same intra prediction information. In the intra-prediction for encoding each subblock, the video encoding device can increase the compression efficiency by using the reconstructed pixels in the earlier encoded subblock as the predicted pixel values of the subsequent subblock.

As mentioned above, when applying this ISP technique, there may be cases where the reference samples of the subblocks are useless due to the intra-prediction mode of the current block and the reconstruction order of the subblocks. Here, the reconstruction order of the subblocks refers to the reconstruction order from the top block to the bottom block in the case of vertical partitioning, and the reconstruction order of the subblocks refers to the reconstruction order from the left block to the right block in the case of horizontal partitioning.

Embodiments are described below that efficiently utilize the already reconstructed samples of a previous subblock to perform intra prediction of a subsequent subblock. Intra prediction using the subblock partitioning according to these embodiments is complementary to existing ISP techniques. Accordingly, the terminology associated with ISP techniques may be reused.

Hereinafter, the present embodiment is described centering on intra prediction utilizing the subblock partitioning by the video decoding device. Such intra prediction may be performed by the entropy decoder 510 and the intra predictor 542 in the video decoding device. Where necessary for ease of description, reference is made to the video encoding device. Nevertheless, most of the embodiments described below can be applied equally or similarly to the video encoding device. In one aspect, the video encoding device determines information related to subblock partitioning in terms of rate distortion optimization. The video encoding device may then encode the determined information to generate a bitstream, which may then be signaled to the video decoding device.

II. Subblock Partitioning and Reference Samples

Figure 7:
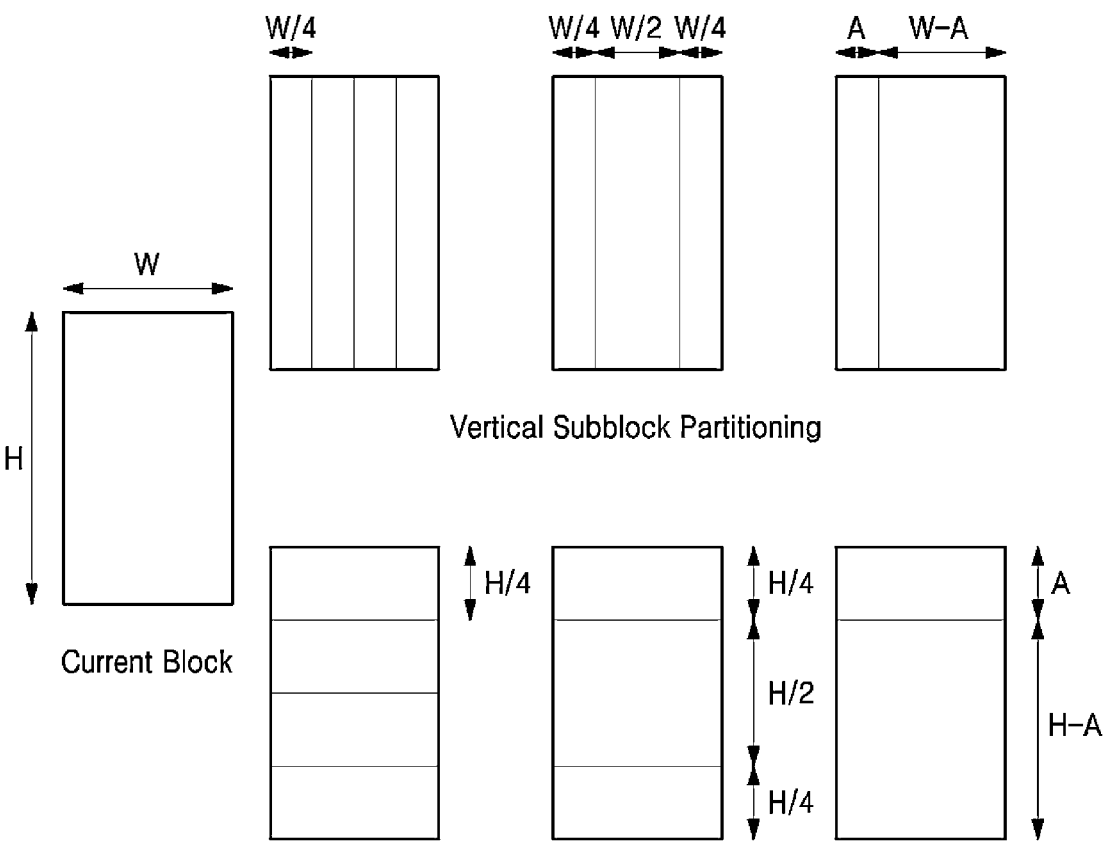
FIG. 7 is a diagram illustrating subblocks subpartitioned from a current block, according to at least one embodiment of the present disclosure.

In subblock partitioning according to this embodiment, a current block of size W×H with intra-prediction mode may be partitioned horizontally or vertically into subblocks of K even or uneven sizes, as illustrated in FIG. 7. At this time, the horizontal or vertical direction is referred to as the partition direction and it may be indicated by the subblock partition direction flag. The data representing the K sizes is called the partition mode. A partition mode index may indicate one partition mode from a list containing a plurality of preset partition modes. Further, the subblock partition direction flag and the partition mode index are collectively referred to as subpartition information.

On the other hand, whether or not to perform subpartitioning into subblocks may be implicitly determined based on the size of the current block. For example, where the current block is smaller than a preset size, subpartitioning into subblocks may not be performed. On the other hand, for a current block larger than the preset size, a 1-bit subblock partition application flag may be parsed to determine whether to perform the subpartitioning. If the subblock partition application flag is true, the subblock partition scheme may be determined by the subblock partition direction flag and the partition mode index. In this case, the video decoding device may decode both the subblock partition direction flag and the partition mode index. Alternatively, the video decoding device may parse the subblock partition direction flag and then may implicitly determine the partition mode based on the size and aspect ratio of the current block.

Figure 8:
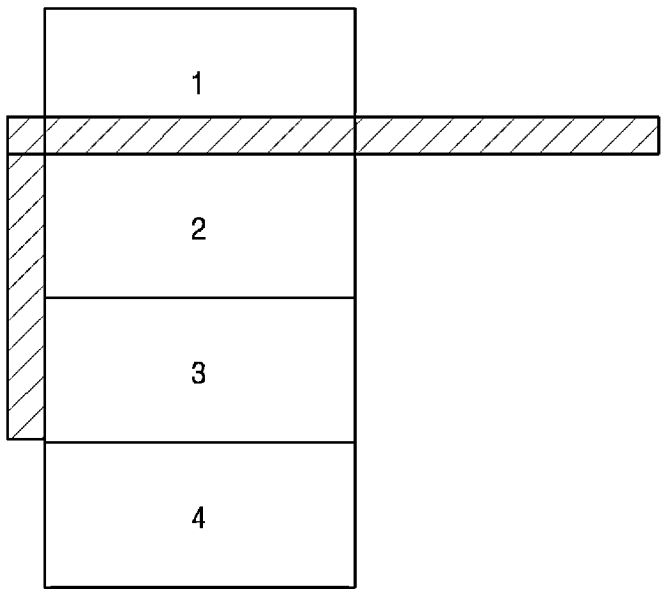
FIG. 8 illustrates subblocks and their reference samples.

The video decoding device performs subblockwise intra prediction on the K subblocks after the subpartitioning. The video decoding device may generate a predicted signals by sequentially performing the intra prediction per subblock basis according to the reconstruction order as described above, may reconstruct the residual signals by performing entropy reconstruction, inverse quantization, and inverse transform, and then may add the residual signals and the predicted signals to generate reconstructed signals of the current block. For the second subblock to the last subblock, the reconstructed subblock samples may be used as reference samples for intra prediction. For example, for the second subblock of the four horizontally divided subblocks, the video decoding device may utilize the reference samples as shown in FIG. 8 for intra prediction of the second subblock.

Figure 9:
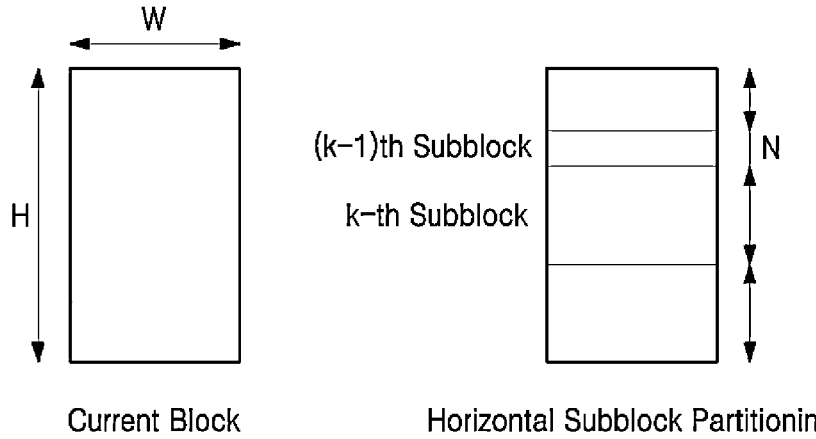
FIG. 9 illustrates a current subblock referencing the previous subblock, according to at least one embodiment of the present disclosure.

In another embodiment, at the horizontal partitioning as illustrated in FIG. 9, where the height of a subblock before the current subblock to be decoded is less than or equal to predetermined N pixels (where N is a positive integer), the video decoding device may not use the reconstructed samples of the previous subblock as reference samples for intra prediction of the subsequent subblocks after the current subblock. In the example of FIG. 9, the (k−1)th subblock is a block with a height of N pixels or less, and the k-th subblock is the current subblock seeking to reference the (k−1)th subblock. For example, if the height of the (k−1)th subblock is less than or equal to the predetermined N pixels, the video decoding device may perform an intra prediction of the current subblock by using reference samples around the current block based on the current block or by using reconstructed samples of a further previous subblock to the (k−1)th subblock in the reconstruction order.

The foregoing is not limited to horizontal partitioning but may be equally applicable to vertical subblock partitioning.

III. Intra Prediction of Subblocks

The following describes one embodiment of the intra prediction method. When a specific directional mode is parsed for the current block, the video decoding device performs subblock-level intra prediction by revising the reconstruction order of the subblocks according to the intra-prediction mode, the aspect ratio of the subblocks, the size of the subblocks, and the like.

Figure 10:
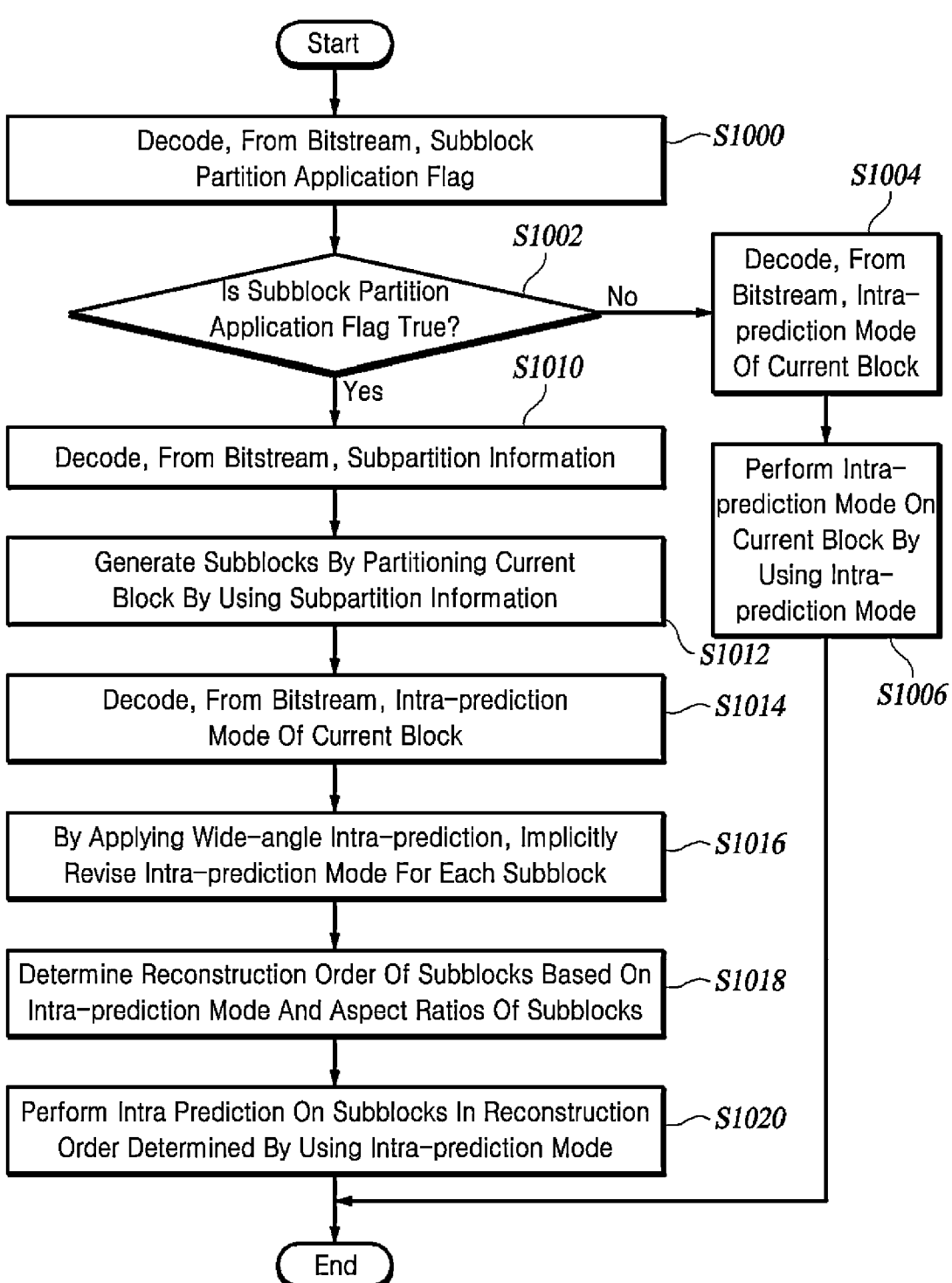
FIG. 10 is a flowchart of an intra prediction method utilizing revision of the subblock reconstruction order, according to at least one embodiment of the present disclosure.

FIG. 10 is a flowchart of an intra prediction method utilizing revision of the subblock reconstruction order, according to at least one embodiment of the present disclosure.

The entropy decoder 510 decodes a subblock partition application flag from the bitstream (S1000). Here, the subblock partition application flag indicates whether to apply subblock partitioning to the current block.

The entropy decoder 510 checks the value of the subblock partition application flag (S1002).

Depending on the value of the subblock partition application flag, the video decoding device may perform intra prediction for the current block or may perform intra prediction for subblocks.

First, if the subblock partition application flag is false (No in S1002), the video decoding device may perform the following steps to perform intra prediction of the current block.

The entropy decoder 510 decodes the intra-prediction mode of the current block from the bitstream (S1004).

The intra predictor 542 performs intra prediction for the current block by using the parsed intra-prediction mode (S1006). By performing the intra prediction, the intra predictor 542 may generate predicted signals of the current block.

If the subblock partition application flag is true (Yes in S1002), the video decoding device may perform the following steps to perform intra prediction of the subblocks.

The entropy decoder 510 decodes the subpartition information from the bitstream (S1010). Here, the subpartition information includes a subblock partition direction flag and a partition mode index.

The entropy decoder 510 may decode both the subblock partition direction flag and the partition mode index. Alternatively, the video decoding device may parse the subblock partition direction flag and may implicitly determine the partition mode based on the size and aspect ratio of the current block.

The intra predictor 542 divides the current block by using the subpartition information to generate subblocks (S1012). The intra predictor 542 may divide the current block in a horizontal direction or a vertical direction by using the subblock partition direction flag and may determine the sizes of the subblocks based on the partition mode index.

The entropy decoder 510 decodes the intra-prediction mode of the current block from the bitstream (S1014).

The intra predictor 542 implicitly revises the intra-prediction mode for each subblock by applying a wide-angle intra-prediction (S1016). The intra predictor 542 may implicitly revise the intra-prediction mode in the opposite direction (into a direction rotated by 180 degrees) according to the aspect ratio of the relevant subblock. However, this implicit revision may be omitted according to embodiments.

The intra predictor 542 determines the reconstruction order of the subblocks based on the intra-prediction mode and the aspect ratios of the subblocks (S1018). At this time, the intra-prediction mode of the current block or the intra-prediction mode revised according to the wide-angle intra-prediction may be utilized for determining the reconstruction order.

In another embodiment, the video decoding device may utilize a 1-bit flag indicating whether to proceed with the determining of the reconstruction order. Hereinafter, such a flag is referred to as a reconstruction order application flag. The video decoding device may always parse the reconstruction order application flag to determine whether to proceed with the determining of the reconstruction order. Alternatively, the video decoding device may additionally parse the reconstruction order application flag when a preset intra-prediction mode is decoded.

The intra predictor 542 performs intra predictions for the subblocks according to the reconstruction order determined by using the intra-prediction mode (S1020). The intra predictor 542 may generate predicted signals of the subblocks by performing an intra prediction of the current subblock.

Figure 11A:
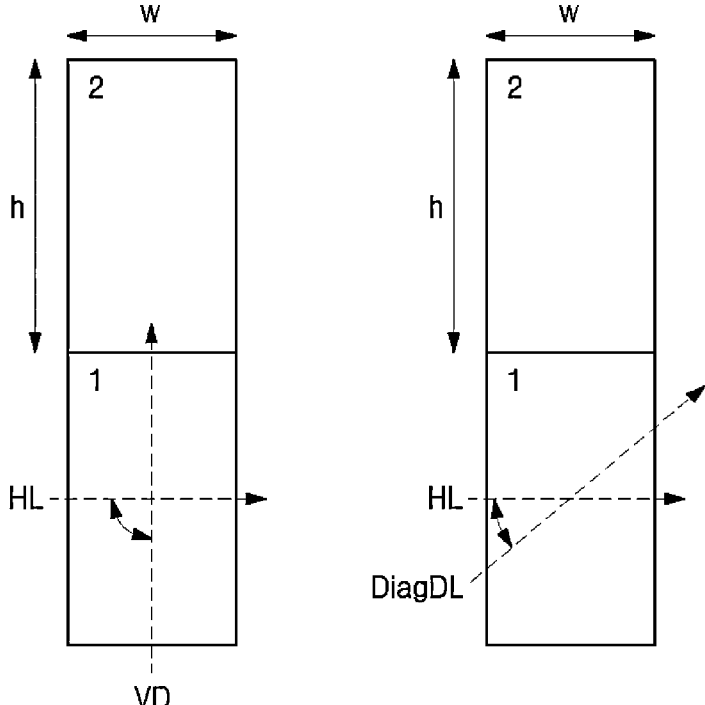
FIGS. 11A and 11B illustrate a reconstruction order determining, according to at least one embodiment of the present disclosure.
Figure 12A:
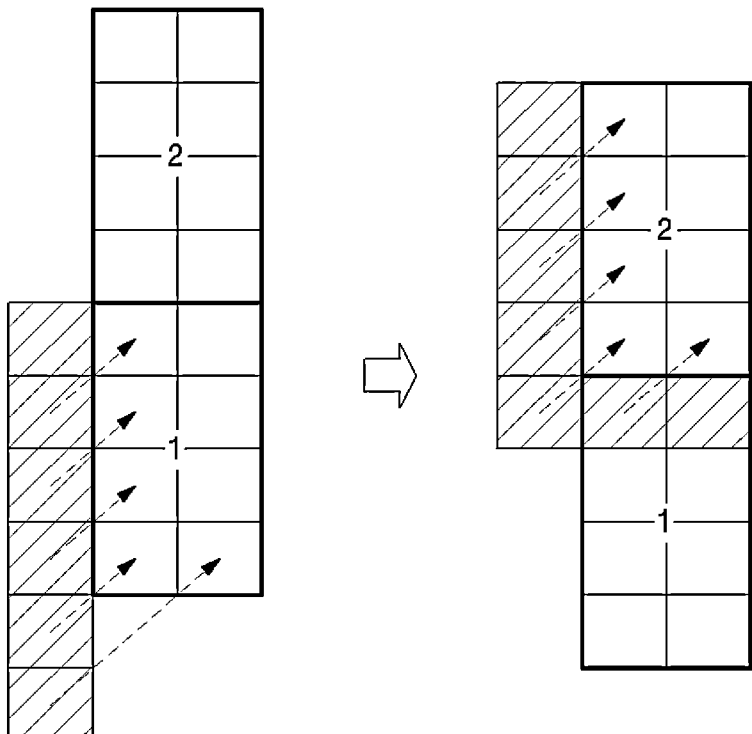
FIGS. 12A and 12B are diagrams illustrating intra predictions utilizing a revised reconstruction order, according to at least one embodiment of the present disclosure.
Figure 12B:
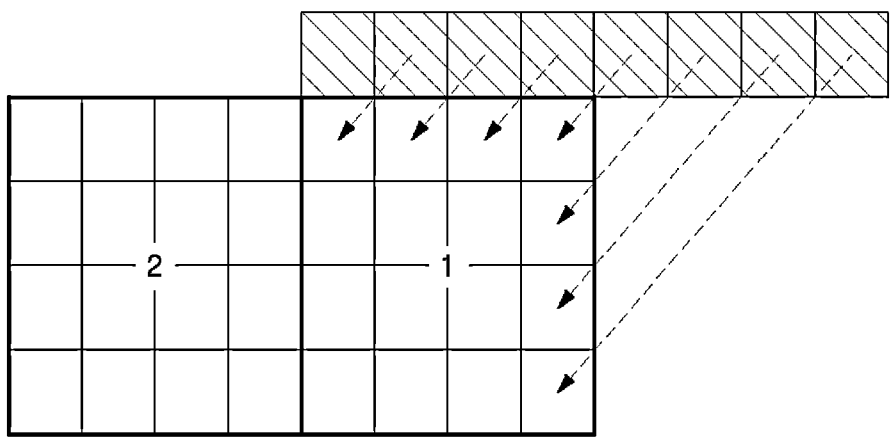
Figure 12B:
Figure 12B:
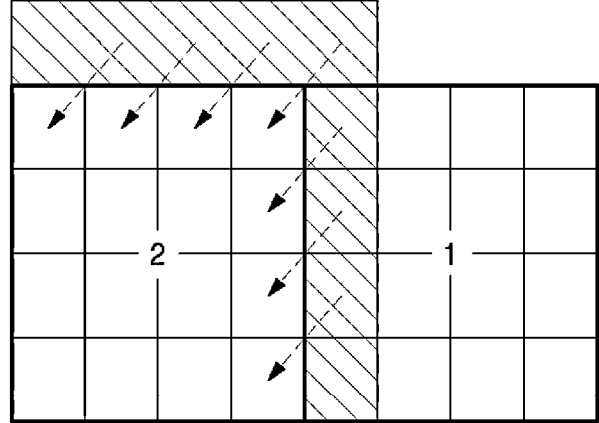

The following describes a reconstruction order determining and its consequential intra prediction using the examples of FIGS. 11A and 12B.

Figure 11B:
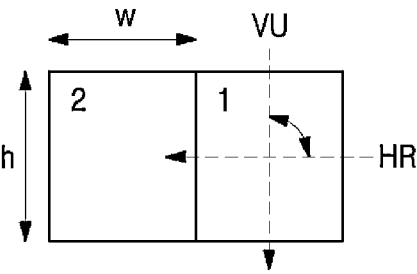
Figure 11B:
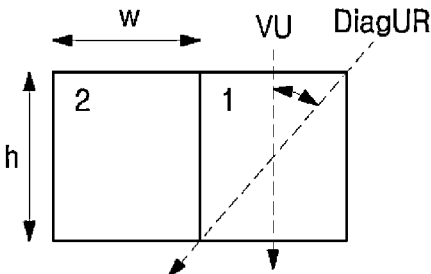

FIGS. 11A and 11B illustrate a reconstruction order determining, according to at least one embodiment of the present disclosure.

At horizontal subblock partitioning, in one embodiment as shown in the example of FIG. 11A, while performing predictions by prediction modes between the VD mode inclusive and the HL mode, the intra predictor 542 may perform reconstruction on the bottom subblock first up to the top subblock in an orderly manner and in the opposite direction to the conventional reconstruction order.

Alternatively, if at least one of the subblocks has an aspect ratio greater than 1, the revision of the reconstruction order may be skipped for the predetermined prediction mode. This is because the wide-angle intra-prediction when applied may implicitly revise the current subblock's predetermined prediction mode in the opposite direction.

Alternatively, the mode involving the revision of the subblock reconstruction order may be limited to a predetermined prediction mode within the range of HL to VD modes. Additionally, a mode outside the aforementioned range may be added as a mode involving the revision of the reconstruction order.

Alternatively, as in the example of FIG. 11A, the modes involving the revision of the reconstruction order may be limited to prediction modes between the DiagDL mode inclusive and the HL mode. Here, the DiagDL mode makes predictions from the bottom left toward the top right.

At vertical partitioning, in at least one embodiment as shown in the example of FIG. 11B, while performing predictions by prediction modes between the HR mode inclusive and the VU mode, the intra predictor 542 may reconstruct a right subblock first up to a left subblock in an orderly manner and in the opposite direction to the conventional reconstruction order.

Alternatively, when the subblocks include at least one subblock that has an aspect ratio of less than 1, the revision of the reconstruction order may be skipped for the predetermined prediction mode. This is because, by applying wide-angle intra-prediction, the predetermined prediction mode may be implicitly revised in the opposite direction.

Alternatively, the mode involving the revision of the subblock reconstruction order may be limited to a preset prediction mode within the range of VU to HR modes. Additionally, a mode outside the aforementioned range may be added as a mode involving the revision of the reconstruction order.

Alternatively, as in the example of FIG. 11B, the modes involving the revision of the reconstruction order may be limited to prediction modes between the DiagUR mode inclusive and the VU mode. Here, the DiagUR mode makes predictions from the top right toward the bottom left.

Meanwhile, in the subblock aspect ratio w/h, w is the width of the subblock and h is the height of the subblock. Thus, at the horizontal partitioning, w is equal to the width W of the current block, and at the vertical partitioning, h is equal to the height H of the current block.

Further, DiagDR mode, HL mode, VU mode, and DiagUR mode correspond respectively to prediction modes 2, 18 (leftward horizontal mode or horizontal mode), mode 50

(upward vertical mode or vertical mode), and mode 66 in the example of FIG. 3B. VD mode (downward vertical mode) represents the opposite direction of VU, and HR mode (rightward horizontal mode) represents the opposite direction of HL mode.

FIGS. 12A and 12B are diagrams illustrating intra predictions utilizing a revised reconstruction order, according to at least one embodiment of the present disclosure.

At horizontal partitioning, as illustrated in FIG. 12A, the video decoding device performs intra predictions on partitioned subblocks, beginning with the lowermost subblock, by parsing residual signals of the partitioned subblocks, performing, on the relevant residual signal, entropy decoding, inverse quantization, and inverse transform to reconstruct the residual signal, and then performing intra prediction on the subblocks by using the left reconstructed samples. Then, the video decoding device may perform intra prediction on the remaining subblocks, beginning with the second lowermost subblock by using the reconstructed samples of the previous subblock reconstructed and using the left reconstructed samples of the subblock.

At vertical partitioning, as illustrated in FIG. 12B, the video decoding device may perform intra predictions on partitioned subblocks, beginning with the rightmost subblock, by parsing residual signals of the partitioned subblocks, performing, on the relevant residual signal, entropy decoding, inverse quantization, and inverse transform to reconstruct the residual signal, and then performing intra prediction on the subblocks by using the left reconstructed samples. Then, the video decoding device may perform intra prediction on the remaining subblocks, beginning with the second rightmost subblock by using the reconstructed samples of the previous subblock reconstructed and using the upper reconstructed samples of the subblock.

On the other hand, at the horizontal partitioning, as described above, if the height of the previously reconstructed subblock is greater than N pixels, the video decoding device may utilize the reconstructed pixels of the previous subblock as reference pixels to perform the intra prediction of the current subblock. This limitation may also apply to vertical partitioning.

The video decoding device may perform, at vertical partitioning, the directional prediction by using the previously reconstructed samples on the right of the current subblock. Additionally, the video decoding device, at horizontal partitioning, may perform the directional prediction by using the previously reconstructed samples at the lower side of the current subblock. In this case, the reconstructed samples may be subjected to a smoothing filter or an interpolation filter for generating fractional positions.

After all the subblocks have been reconstructed, the video decoding device may perform deblocking filtering on the current block. In another embodiment, the video decoding device may apply deblocking filtering to the boundaries of the subblocks. In this case, the decision to apply deblocking filtering may be based on the size, aspect ratio, or the like of the subblocks. When performing deblocking filtering on the subblock boundaries, the video decoding device may perform deblocking filtering on the subblock boundaries after all subblocks are reconstructed.

As another embodiment of the intra prediction method, the following describes a method performed by the video decoding device for providing subblock-level intra prediction by revising the intra-prediction mode in the opposite direction depending on the intra-prediction mode, the aspect ratio of the subblock, the direction of partitioning the subblock, the size of the subblock, and the like.

Figure 13:
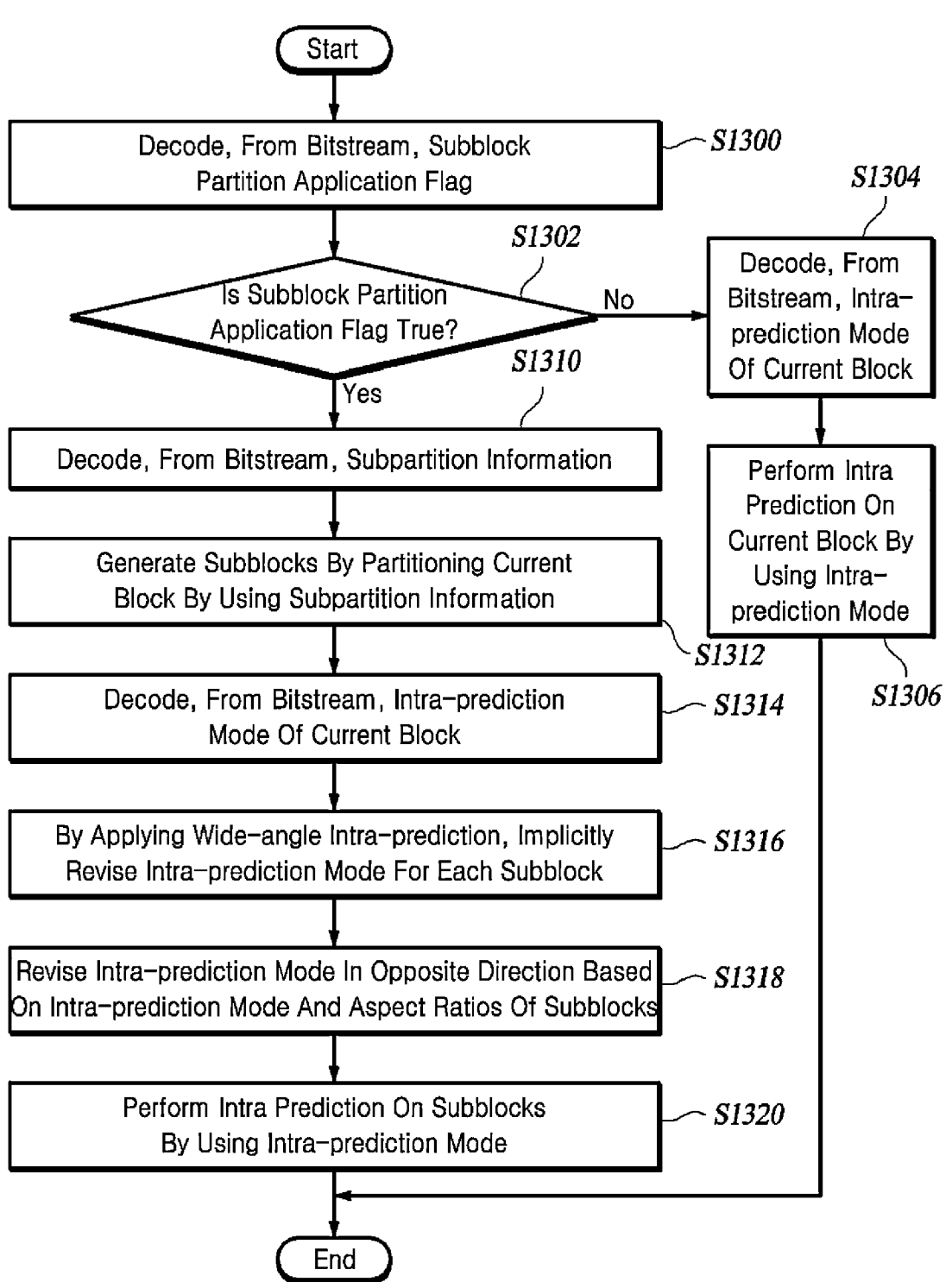
FIG. 13 is a flowchart of an intra prediction method utilizing a revision of the intra-prediction mode in the opposite direction, according to another embodiment of the present disclosure.

FIG. 13 is a flowchart of an intra prediction method utilizing a revision of the intra-prediction mode in the opposite direction, according to another embodiment of the present disclosure.

In the example of FIG. 13, Steps S1300 through S1306, and S1310 through S1316 are already described in the example of FIG. 10, so further description is omitted.

The intra predictor 542 revises the intra-prediction mode in the opposite direction based on the intra-prediction mode and the aspect ratios of the subblocks (S1318). At this time, the intra-prediction mode of the current block or the intra-prediction mode revised according to the wide-angle intra-prediction may be utilized for the revision in the opposite direction.

The intra predictor 542 performs intra predictions for the subblocks by using the intra-prediction mode (S1320). The intra predictor 542 may perform an intra prediction of the current subblock to generate predicted signals of the subblocks.

Hereinafter, by using the examples of FIGS. 14A and 14B, the revisions in the opposite direction and the resultant intra predictions are described.

Figure 14A:
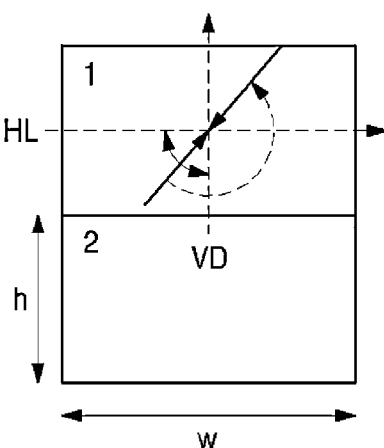
FIGS. 14A and 14B are diagrams each illustrating a revision in the opposite direction according to yet another embodiment of the present disclosure.
Figure 14B:
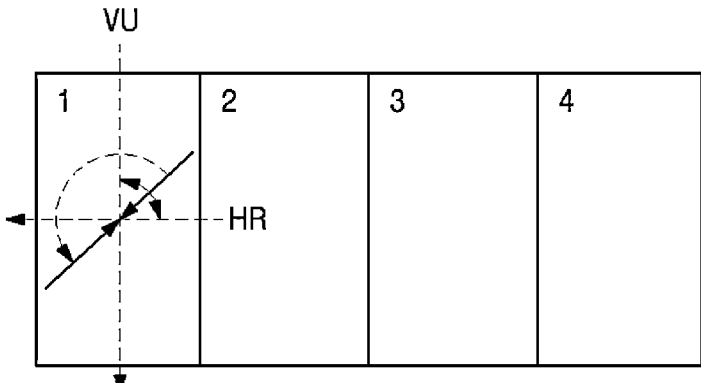

FIGS. 14A and 14B are diagrams each illustrating a revision in the opposite direction according to yet another embodiment of the present disclosure.

At horizontal partitioning, in at least one embodiment as illustrated in FIG. 14A, while performing predictions by prediction modes between the VD mode inclusive and the HL mode, the intra predictor 542 may perform intra predictions on the subblocks in the opposite directions to the relevant prediction modes.

Alternatively, for the mode subject to the revision in the opposite direction, a specific prediction mode based on the size and/or aspect ratio of the subblock may be agreed to be used.

Alternatively, if the subblock has an aspect ratio less than 1, the revision in prediction mode in the opposite direction may be omitted based on the subblock's aspect ratio.

Alternatively, the modes subject to the revision in the opposite direction may be limited to prediction modes between the DiagDL mode inclusive and the HL mode.

At vertical partitioning, in at least one embodiment as shown in the example of FIG. 14B, while performing predictions by prediction modes between the HR mode inclusive and the VU mode, the intra predictor 542 may perform intra predictions on the subblocks in the opposite directions to the relevant prediction modes.

Alternatively, for the mode involving the revision in the opposite direction, a particular prediction mode based on the size and/or aspect ratio of the subblock may be agreed to be used.

Alternatively, if the subblock has an aspect ratio greater than 1, the revision in prediction mode in the opposite direction may be omitted based on the subblock's aspect ratio.

Alternatively, the modes that are revised in the opposite direction may be limited to prediction modes between DiagUR mode inclusive and VU mode.

Yet another embodiment of the intra prediction method is for the video decoding device to perform intra predictions per subblock basis when the video encoding device and the video decoding device agreed to restrict the signaling of a preset intra-prediction mode. At this time, the mode restricted by the agreement between the video encoding device and the video decoding device may be determined based on a subblock partition direction, the aspect ratio of the subblock, the size of the subblock, and the like.

Figure 15:
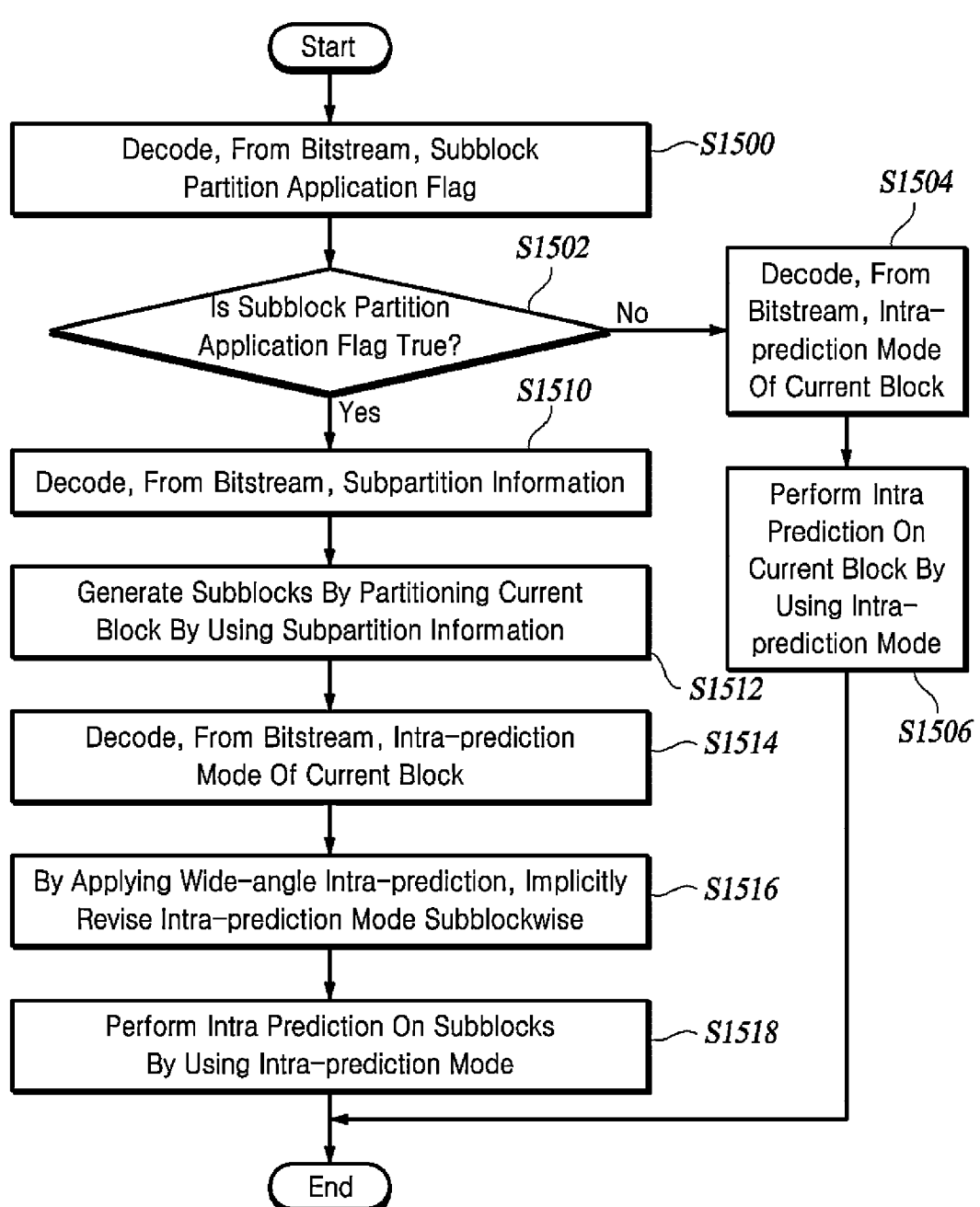
FIG. 15 is a flowchart of an intra prediction method utilizing usage restrictions of a preset intra-prediction mode, according to yet another embodiment of the present disclosure.

FIG. 15 is a flowchart of an intra prediction method utilizing usage restrictions of a preset intra-prediction mode, according to yet another embodiment of the present disclosure.

In the example of FIG. 15, Steps S1500 through S1506, S1510, and S1512 have already been described in the example of FIG. 10, so further description is omitted.

The entropy decoder 510 decodes, from the bitstream, the intra-prediction mode of the current block (S1514). At this time, the intra-prediction mode is one of the prediction modes free of the usage restriction agreement on prediction modes between the video encoding device and the video decoding device. The prediction modes are described below, which are not signaled under the usage restriction imparted by the video encoding device.

The intra predictor 542 implicitly revises subblockwise the intra-prediction mode by applying a wide-angle intra-prediction (S1516).

The intra predictor 542 performs intra predictions for the subblocks by using the intra-prediction modes (S1518). The intra predictor 542 may perform intra prediction of the current subblock to generate the predicted signals of the subblocks.

Figure 16A:
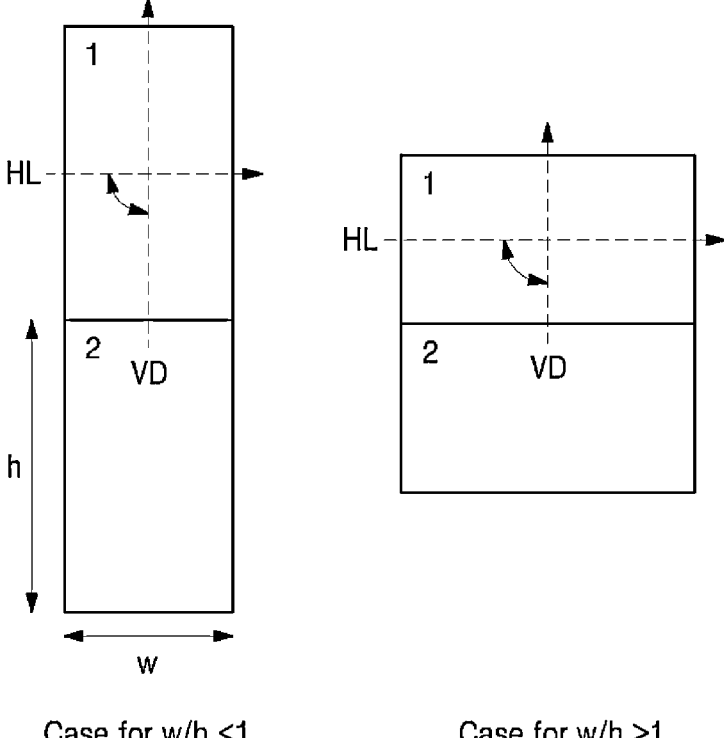
FIGS. 16A and 16B are diagrams illustrating prediction modes under usage restrictions, according to yet another embodiment of the present disclosure.
Figure 16B:
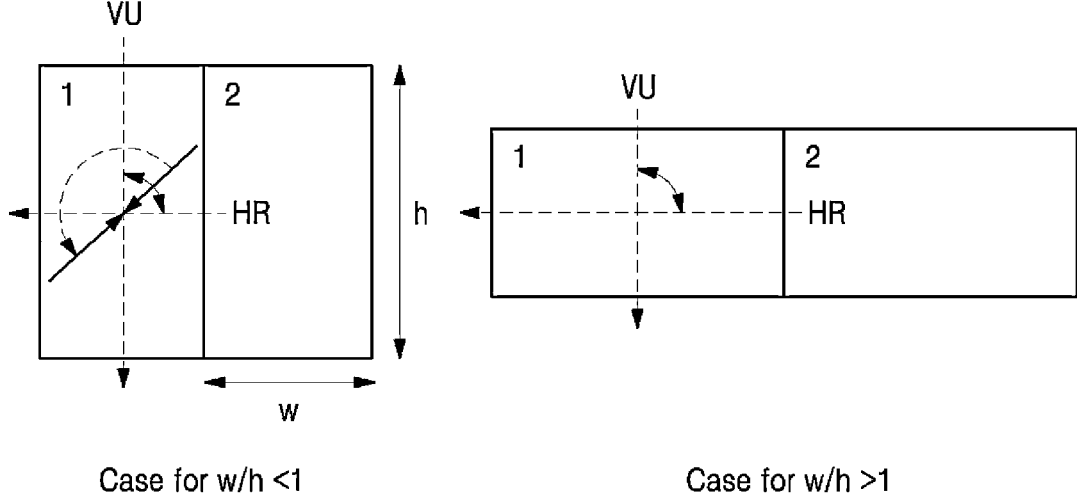

The following describes using the examples of FIGS. 16A and 16B about a method for the video encoding device to determine usage-restricted prediction modes.

According to at least one embodiment, the video encoding device may obtain a 1-bit flag from a high level and then may, based on the value of the flag, enable the determination of the restricted prediction mode. Hereinafter, the flag for enabling the restricted prediction mode determination is referred to as a restricted prediction mode-enabling flag. Thus, when the restricted prediction mode-enabling flag is true, the video encoding device may also determine the restricted prediction modes according to the example of FIG. 16A and FIG. 16B.

FIGS. 16A and 16B are diagrams illustrating prediction modes under usage restrictions, according to yet another embodiment of the present disclosure.

At horizontal partitioning, in at least one embodiment, as illustrated in FIG. 16A, the video encoding device may restrict signaling of the prediction modes between the VD mode and the HL mode where the intra-prediction modes cannot take advantage of reference samples of the previously reconstructed subblock. Further, the signaling-restricted prediction modes may be inclusive of the VD mode and/or the HL mode.

In another embodiment, for the signaling-restricted prediction modes, certain modes based on the size and aspect ratio of the subblock may be agreed to be used. Further, prediction modes between DiagDL mode and HL mode may be defined as signaling-restricted prediction modes.

Alternatively, if the aspect ratio of the subblock is greater than 1, the video encoding device may take prediction modes between the VD mode and the HL mode based on the aspect ratio of the subblock, to implicitly determine such prediction modes as to be modes in the opposite direction. Therefore, the video encoding device may perform signaling without limiting the prediction modes that may be determined as the modes in the opposite direction.

At vertical partitioning, in at least one embodiment, as illustrated in FIG. 16B, the video encoding device may restrict signaling of the prediction modes between the HR mode and the VU mode where the intra-prediction modes cannot take advantage of reference samples of the previously reconstructed subblock. Further, the signaling-restricted prediction modes may be inclusive of the HR mode and/or the VU mode.

In another embodiment, for the signaling-restricted prediction modes, certain modes based on the size and aspect ratio of the subblock may be agreed to be used. Further, prediction modes between DiagUR mode and VU mode may be defined as signaling-restricted prediction modes.

Alternatively, if the aspect ratio of the subblock is greater than 1, the video encoding device may take prediction modes between the VU mode and the HR mode based on the aspect ratio of the subblock, to implicitly determine such prediction modes as to be modes in the opposite direction. Therefore, the video encoding device may perform signaling without limiting the prediction modes that may be determined as the modes in the opposite direction.

In another embodiment, when utilizing the Most Probable Mode (MPM) for transmitting the intra-prediction modes, the video encoding device may exclude the restricted prediction modes as described above from the components of the MPM list. The video encoding device may replace the excluded prediction modes with other prediction modes as agreed with the video decoding device.

Although the steps in the respective flowcharts are described to be sequentially performed, the steps merely instantiate the technical idea of some embodiments of the present disclosure. Therefore, a person having ordinary skill in the art to which this disclosure pertains could perform the steps by changing the sequences described in the respective drawings or by performing two or more of the steps in parallel. Hence, the steps in the respective flowcharts are not limited to the illustrated chronological sequences.

It should be understood that the above description presents illustrative embodiments that may be implemented in various other manners. The functions described in some embodiments may be realized by hardware, software, firmware, and/or their combination. It should also be understood that the functional components described in this specification are labeled by " . . . unit" to strongly emphasize the possibility of their independent realization.

Meanwhile, various methods or functions described in some embodiments may be implemented as instructions stored in a non-transitory recording medium that can be read and executed by one or more processors. The non-transitory recording medium may include, for example, various types of recording devices in which data is stored in a form readable by a computer system. For example, the non-transitory recording medium may include storage media such as erasable programmable read-only memory (EPROM), flash drive, optical drive, magnetic hard drive, and solid state drive (SSD) among others.

Although embodiments of the present disclosure have been described for illustrative purposes, those having ordinary skill in the art to which this disclosure pertains should appreciate that various modifications, additions, and substitutions are possible, without departing from the idea and scope of the present disclosure. Therefore, embodiments of the present disclosure have been described for the sake of brevity and clarity. The scope of the technical idea of the embodiments of the present disclosure is not limited by the illustrations. Accordingly, those having ordinary skill in the art to which this disclosure pertains should understand that the scope of the present disclosure is not to be limited by the above explicitly described embodiments but by the claims and equivalents thereof.

REFERENCE NUMERALS

122: intra predictor
510: entropy decoder
542: intra predictor

What is claimed is:

1. A method performed by a video decoding device for intra predicting a current block, the method comprising:

decoding, from a bitstream, a subblock partition application flag that indicates whether to apply subpartitioning to the current block; and performing an intra prediction of the current block in accordance with the subblock partition application flag, wherein performing the intra prediction comprises, when the subblock partition application flag is true:

decoding subpartition information from the bitstream;

generating subblocks by partitioning the current block by using the subpartition information;

decoding an intra prediction mode of the current block from the bitstream;

determining, for each subblock, an intra prediction mode based on the intra prediction mode of the current block;

determining a reconstruction order of the subblocks; and generating prediction signals of the subblocks by performing an intra prediction on the subblocks by using the intra prediction modes and the reconstruction order of the subblocks, and wherein determining the reconstruction order of the subblocks comprises at least one of:

(i) determining, when the current block is horizontally partitioned and the intra prediction mode of the current block has a direction between a left direction and a bottom-left direction, the reconstruction order of the subblocks such that the subblocks are reconstructed in an order from a bottom sub-block to a top sub-block;

(ii) determining, when the current block is vertically partitioned and the intra prediction mode of the current block has a direction between a right direction and a top-right direction, the reconstruction order of the subblocks such that the subblocks are reconstructed in an order from a right sub-block to a left sub-block; or (iii) a combination thereof.

2. The method of claim 1, wherein the subpartition information comprises:

a subblock partition direction flag and an index of a partition mode, wherein the partition mode indicates sizes of K equal or unequal subblocks, and wherein the index of the partition mode indicates one partition mode from a list comprising a plurality of preset partition modes.

3. The method of claim 2, wherein generating the subblocks comprises:

determining a horizontal partitioning or a vertical partitioning based on the subblock partition direction flag;

determining the sizes of the subblocks based on the index of the partition mode; and partitioning the current block based on a determination between horizontal and vertical partitioning and further based on sizes of the subblocks.

4. The method of claim 3, wherein performing the intra prediction comprises:

upon determining the horizontal partitioning, when the subblocks include at least one subblock having an aspect ratio greater than 1, skipping a revision of a reconstruction order of the subblocks for a preset prediction mode.

5. The method of claim 3, wherein generating predicted signals comprises:

upon determining the horizontal partitioning, when a previously reconstructed subblock has a height that is greater than N pixels (wherein N is a positive integer), performing the intra prediction of the subblocks by using reconstructed pixels of the previously reconstructed subblock.

6. The method of claim 3, wherein generating predicted signals comprises:

upon determining the horizontal partitioning, performing the intra prediction of the subblocks by using reconstructed pixels located downward of each subblock.

7. The method of claim 3, wherein performing the intra prediction comprises:

upon determining the vertical partitioning, when the subblocks include at least one subblock having an aspect ratio greater than 1, skipping a revision of a reconstruction order of the subblocks for a preset prediction mode.

8. The method of claim 3, wherein generating the predicted signals comprises:

upon determining the vertical partitioning, performing the intra prediction of the subblocks by using reconstructed pixels located rightward of each subblock.

9. The method of claim 1, further comprising:

determining a reconstruction order of the subblocks based on the intra prediction mode and the aspect ratio of each subblock.

10. The method of claim 1, wherein performing the intra prediction comprises, when the subblock partition application flag is false:

decoding the intra prediction mode of the current block from the bitstream; and generating predicted signals of the current block by performing an intra prediction on the current block by using the intra prediction mode.

11. A method performed by a video encoding device for intra predicting a current block, the method comprising:

determining whether to apply subpartitioning to a current block;

encoding a subblock partition application flag that indicates whether to apply subpartitioning to the current block; and performing an intra prediction of the current block based on whether the subpartitioning is applied to the current block, wherein performing the intra prediction comprises, when the subpartitioning is applied to the current block:

generating subblocks by partitioning the current block;

determining an intra prediction mode of the current block;

determining a reconstruction order of the subblocks; and generating prediction signals of the subblocks by performing an intra prediction on the subblocks by using the intra prediction modes and the reconstruction order of the subblocks, wherein determining the reconstruction order of the subblocks comprises at least one of:

(i) determining, when the current block is horizontally partitioned and the intra prediction mode of the current block has a direction between a left direction and a bottom-left direction, the reconstruction order of the subblocks such that the subblocks are reconstructed in an order from a bottom sub-block to a top sub-block;

(ii) determining, when the current block is vertically partitioned and the intra prediction mode of the current block has a direction between a right direction and a top-right direction, the reconstruction order of the subblocks such that the subblocks are reconstructed in an order from a right sub-block to a left sub-block; or (iii) a combination thereof.

12. The method of claim 11, wherein performing the intra prediction comprises, when the subblock partition application flag is false:

determining the intra prediction mode of the current block; and generating predicted signals of the current block by performing an intra prediction on the current block by using the intra prediction mode.

13. A method for transmitting a bitstream containing encoded video data, the method comprising:

generating the bitstream for a current block in an image; and transmitting the bitstream, wherein generating the bitstream for the image comprises:

determining whether to apply subpartitioning to the current block;

encoding a subblock partition application flag that indicates whether to apply subpartitioning to the current block; and performing an intra prediction of the current block based on whether the subpartitioning is applied to the current block, wherein performing the intra prediction comprises, when the subpartitioning is applied to the current block:

generating subblocks by partitioning the current block;

determining an intra prediction mode of the current block;

determining a reconstruction order of the subblocks; and generating prediction signals of the subblocks by performing an intra prediction on the subblocks by using the intra prediction modes and the reconstruction order of the subblocks, wherein determining the reconstruction order of the subblocks comprises at least one of:

(i) determining, when the current block is horizontally partitioned and the intra prediction mode of the current block has a direction between a left direction and a bottom-left direction, the reconstruction order of the subblocks such that the subblocks are reconstructed in an order from a bottom sub-block to a top sub-block;

(ii) determining, when the current block is vertically partitioned and the intra prediction mode of the current block has a direction between a right direction and a top-right direction, the reconstruction order of the subblocks such that the subblocks are reconstructed in an order from a right sub-block to a left sub-block; or (iii) a combination thereof.

\* \* \* \* \*